(12) United States Patent
Wolfram et al.

(10) Patent No.: US 9,875,319 B2
(45) Date of Patent: Jan. 23, 2018

(54) AUTOMATED DATA PARSING

(71) Applicant: WOLFRAM ALPHA LLC, Champaign, IL (US)

(72) Inventors: Stephen Wolfram, Concord, MA (US); Taliesin Sebastian Beynon, Somerville, MA (US)

(73) Assignee: Wolfram Alpha LLC, Champaign, IL (US)

( * ) Notice: Subject to any disclaimer, the term of this patent is extended or adjusted under 35 U.S.C. 154(b) by 453 days.

(21) Appl. No.: 14/216,461

(22) Filed: Mar. 17, 2014

(65) Prior Publication Data

US 2014/0280256 A1 Sep. 18, 2014

Related U.S. Application Data

(60) Provisional application No. 61/793,546, filed on Mar. 15, 2013.

(51) Int. Cl.
- *G06F 17/30* (2006.01)
- *G06F 17/27* (2006.01)
- *G06F 9/44* (2006.01)

(52) U.S. Cl.
CPC .... *G06F 17/30943* (2013.01); *G06F 17/2705* (2013.01); *G06F 8/37* (2013.01)

(58) Field of Classification Search
CPC ... G06F 17/2705; G06F 8/37; G06F 17/30943
USPC .......................................... 707/755; 717/143
See application file for complete search history.

(56) References Cited

U.S. PATENT DOCUMENTS

| | | | | |
|---|---|---|---|---|
| 5,193,192 A | * | 3/1993 | Seberger | B44C 5/02 707/999.101 |
| 5,768,603 A | * | 6/1998 | Brown | G06F 17/2755 704/232 |
| 5,893,911 A | * | 4/1999 | Piskiel | G06F 9/542 707/694 |
| 5,963,742 A | * | 10/1999 | Williams | G06F 8/427 704/9 |
| 6,278,967 B1 | * | 8/2001 | Akers | G06F 17/271 704/2 |

(Continued)

OTHER PUBLICATIONS

AdviseStat, 'Advise Analytics', http://web.archive.org/web/20120515001517//adviseanalytics.com/advisestat, 3 pages, retrieved from the internet on May 20, 2013.

(Continued)

*Primary Examiner* — Shahid Alam
*Assistant Examiner* — Nargis Sultana

(57) ABSTRACT

A framing technique included in a set of framing techniques is applied to at least a portion of a target data set. When a result of the application of the framing technique meets a first condition, a typing technique included in a set of typing techniques is applied to the target data set. When a result of the application of the typing technique meets a second condition, a tokenization technique included in a set of tokenization techniques is applied to the target data set. When a result of the application of the tokenization technique meets a third condition, a parsing technique for the target data set is determined to include the framing technique, the typing technique and the tokenization technique. An indication of the parsing technique is generated.

31 Claims, 8 Drawing Sheets

(56) References Cited

U.S. PATENT DOCUMENTS

| | | | | |
|---|---|---|---|---|
| 6,687,404 | B1* | 2/2004 | Hull | G06K 9/00442 |
| | | | | 382/180 |
| 6,760,695 | B1* | 7/2004 | Kuno | G06F 17/271 |
| | | | | 704/2 |
| 8,543,379 | B1* | 9/2013 | Michelsen | G06F 17/2705 |
| | | | | 704/9 |
| 2002/0111951 | A1* | 8/2002 | Zeng | G06F 17/2705 |
| 2002/0165707 | A1* | 11/2002 | Call | G06F 17/277 |
| | | | | 704/2 |
| 2003/0115039 | A1* | 6/2003 | Wang | G06F 17/271 |
| | | | | 704/4 |
| 2004/0034525 | A1* | 2/2004 | Pentheroudakis | G06F 17/2735 |
| | | | | 704/9 |
| 2004/0193560 | A1* | 9/2004 | Atamer | G06F 17/3053 |
| | | | | 706/46 |
| 2004/0243554 | A1* | 12/2004 | Broder | G06F 17/30613 |
| 2004/0243556 | A1* | 12/2004 | Ferrucci | G06F 17/30622 |
| 2004/0243560 | A1* | 12/2004 | Broder | G06F 17/30622 |
| 2004/0264696 | A1* | 12/2004 | Cockburn | H03M 7/3084 |
| | | | | 380/200 |
| 2005/0022207 | A1* | 1/2005 | Grabarnik | G06F 8/427 |
| | | | | 719/313 |
| 2005/0086579 | A1* | 4/2005 | Leitner | G06Q 30/02 |
| | | | | 715/229 |
| 2006/0117307 | A1* | 6/2006 | Averbuch | G06F 17/2247 |
| | | | | 717/143 |
| 2007/0239361 | A1 | 10/2007 | Hathaway | |
| 2008/0281580 | A1* | 11/2008 | Zabokritski | G06F 17/271 |
| | | | | 704/9 |
| 2011/0099200 | A1* | 4/2011 | Blount | G06F 21/32 |
| | | | | 707/770 |
| 2012/0016660 | A1* | 1/2012 | Gillam | G06F 17/2715 |
| | | | | 704/8 |
| 2012/0197914 | A1* | 8/2012 | Harnett | G06F 17/30637 |
| | | | | 707/755 |
| 2013/0031082 | A1* | 1/2013 | Wolfram | G06F 17/30401 |
| | | | | 707/706 |
| 2013/0166530 | A1* | 6/2013 | Pilat | G06F 17/30873 |
| | | | | 707/708 |
| 2014/0229497 | A1* | 8/2014 | Wolfram | G06F 17/30569 |
| | | | | 707/758 |

OTHER PUBLICATIONS

Cox, 'Regular Expression Matching with a Trigram Index or How Google Code Search Worked', Jan. 2012, http://swtch.com/~rsc/regexp/regexp4.html, 10 pages, retrieved from the internet on May 20, 2013.

IBM, "Many Eyes: Tour", http://www-958.ibm.com/software/analytics/manyeyes/page/Tour.html, 14 pages, copyright 2010, retrieved from the internet May 20, 2013.

Wolfram Mathematica 8, 'Features of Mathematica 8: Data Sources & Analysis', http://web.archive.org/web/20121028113010//http://wolfram.com/mathematica/features/data . . . , 3 pages, copyright 2012, retrieved from the internet May 20, 2013.

Wikipedia, 'Rete algorithm' definition, http://web.archive.org/web/20130324034239/http://en.wikipedia.org/wiki/Rete_algorithm, 9 pages, retrieved from the internet May 20, 2013.

Tableau Software, 'Tableau Technology', http://web.archive.org/web/20130115163626/http:www.tableausoftware.com/products/ . . . , 4 pages, copyright 2012, retrieved from the internet May 20, 2013.

U.S. Appl. No. 13/608,817, filed Sep. 10, 2012, Application as Filed, 33 pages.

U.S. Appl. No. 12/780,685, filed May 14, 2010, Application as Filed, 32 pages.

Hanrahan et al., "Visual Analysis for Everyone," Tableau Software, http://www.tableausoftware.com/sites/default/files/whitepapers/visual-analysis-for-everyone.pdf, 17 pages (Jan. 2007).

* cited by examiner

US 9,875,319 B2

AUTOMATED DATA PARSING

CROSS REFERENCES TO RELATED APPLICATIONS

This application is claims the benefit of U.S. Provisional Patent Application No. 61/793,546, entitled "Automated Data Parsing," and filed on Mar. 15, 2013, the entire disclosure of which is hereby incorporated by reference herein.

Additionally, this application is related to U.S. patent application Ser. No. 13/763,568, entitled "Automated Data Analysis" and filed on Feb. 8, 2013, the entire disclosure of which is hereby incorporated by reference herein.

BACKGROUND

Data analysis or visualization tools and systems typically allow a user to input or enter a data set by, for example, uploading a file to the system or, in some cases, by manually inputting data points or data values. The data analysis tool must parse the data set before the data can be analyzed, where parsing includes analyzing and interpreting strings of symbols in the data according to certain rules.

Common parsing systems create meaningful combinations of symbols, or tokens, from strings of symbols in the data set, check for allowable combinations of symbols and/or tokens, and detect the meaning of the allowed symbols and/or tokens. Often, the rules used to accomplish these parsing activities are data format-specific (i.e. the parsing rules vary greatly for different data formats). For example, appropriate rules for parsing a spreadsheet data set may differ greatly from the appropriate rules for parsing a scripting language file. As such, many data analysis systems are only capable of operating on a certain finite number of data set formats. For example, a spreadsheet software application, such as Microsoft Excel®, only accepts pre-defined spreadsheet data formats such as Excel Binary File Format (XLS), comma separated values (CSV), OpenDocument spreadsheet (ODS), etc. If a data set in an unknown format is input to the spreadsheet software application, the application will parse the data set incorrectly, assuming the software even allows such input.

Other parsing systems, such as those used in search engines, do not necessarily restrict parsing to certain data set formats. Rather, many search engines parse search terms having an arbitrary format and are then able to retrieve relevant information related to the search terms using reference data indexing techniques. For example, a search engine user may input "United States of America" into the search engine. The search engine then references an indexed list of previously parsed documents, websites, etc. containing the terms "United," "States," and "America" or combinations of those terms, and the search engine uses the index to appropriately match the phrase "United States of America" with information contained in the index. Although useful for searching reference data, parsing systems making use of referenced data indexing are limited by the amount of reference data available.

DETAILED DESCRIPTION

Figure 1:
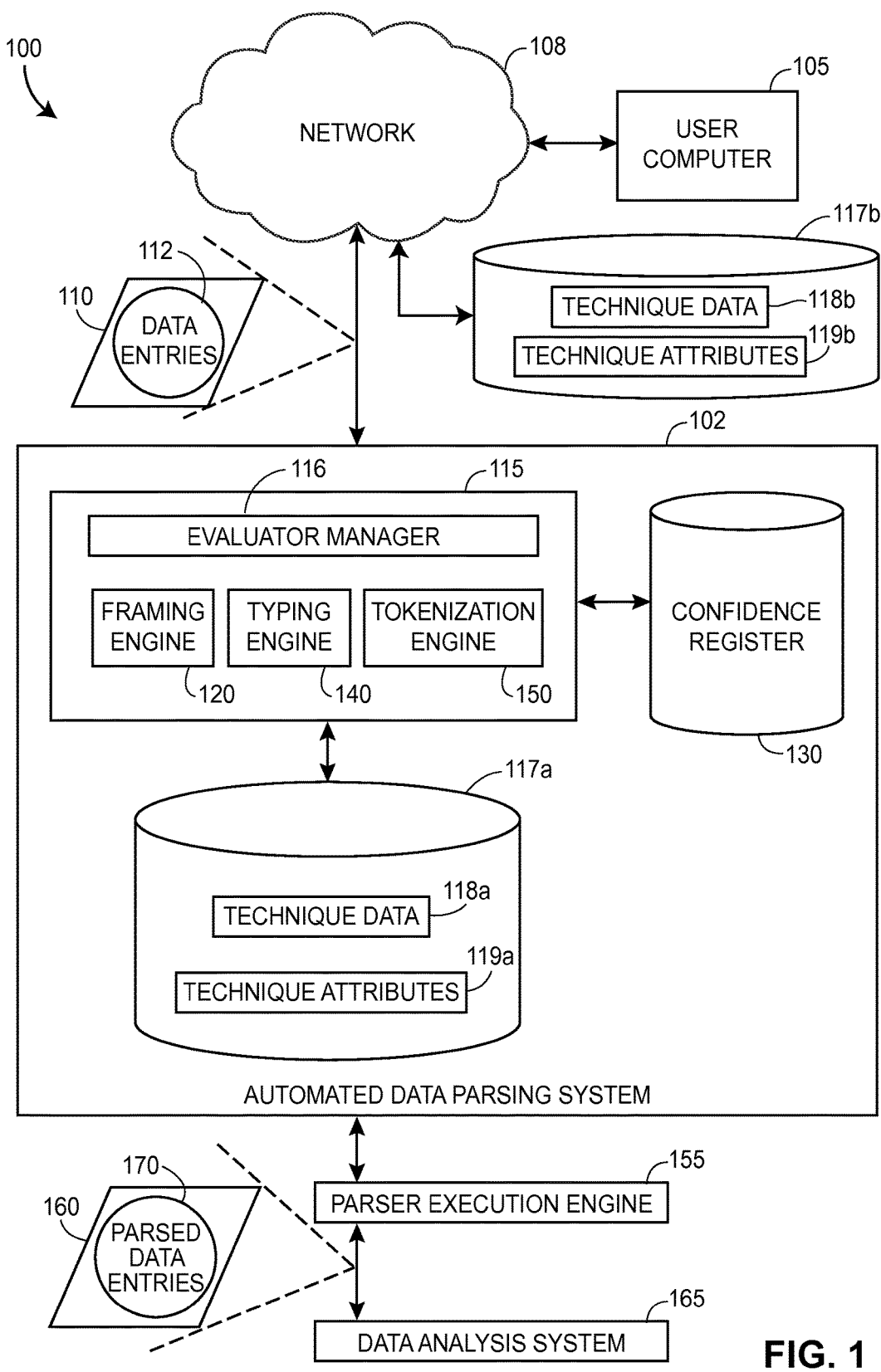
FIG. 1 is a block diagram of an example system for automatically parsing a data set, according to an embodiment.

Embodiments described herein generally relate to automated parsing, using a Bayesian-related probabilistic approach, of data sets in which one or more of the structure, format, data types, etc., of the data are unknown beforehand. In some embodiments, automated parsing techniques may be used in conjunction with a data analysis system that analyzes the parsed target data.

In some embodiments, an automated data parsing (ADP) system may receive a target data set, analyze the target data set, and determine an appropriate, suitable or sufficient parsing technique for the data set based on a Bayesian-based analysis of the target data set. The appropriate parsing technique may include techniques for framing, typing, and/or tokenizing the target data set. "Framing," as used herein, generally refers to the process of detecting one or more structures utilized within the target data set. "Typing," as used herein, generally refers to detecting data types within the target data set. "Tokenization," as used herein, generally refers to appropriately segmenting strings of characters and/or symbols of data entries of the target data set, and interpreting the segmented strings of characters and/or symbols. Upon determining an appropriate parsing technique including an appropriate framing technique, an appropriate typing technique, and an appropriate tokenization technique, the ADP system may then parse the target data set according to the determined parsing technique, e.g., first by framing the target data set, then by typing the data set, and finally by tokenizing the data set. In an embodiment, the ADP system causes the parsed data set to be delivered to an application, e.g., via an application programming interface (API), to a user interface application, or to a data analysis application, etc.

In an embodiment, the ADP system determines a set of parsing techniques for the target data set by evaluating one or more candidate framing, typing, and tokenization sub-techniques likely to be appropriate for the target data set, and that are included in a set of known, pre-defined, or available parsing techniques. The set of known, pre-defined, or available parsing techniques may include sets of known, pre-defined, or available framing, typing and tokenization techniques. In an embodiment, evaluation of a parsing technique encompasses applying the particular parsing technique to at least a portion of the target data set to generate a result. The result of the evaluation may, in an embodiment, cause the ADP system to accumulate additional evidence regarding the nature of the target data set, which the ADP system may then use to determine the identities and/or orders of execution of other candidate framing, typing, and/or tokenization techniques in subsequent evaluations. In an embodiment, the result of the evaluation may also cause the ADP system to backtrack to a previous evaluation and restart evaluation from that point.

To determine the set and/or to determine the order of candidate parsing techniques to evaluate against the target data set, the ADP system accesses a set of indications of candidate parsing techniques, in an embodiment. The set of indications of candidate parsing techniques is referred to herein as a "candidates set." The candidates set includes, for example, indications of one or more candidate framing, typing, and/or tokenization techniques.

In an embodiment, the candidates set may indicate dependencies between the parsing techniques indicated therein. In an example, the candidates set indicates one or more framing techniques upon which one or more typing techniques depend. That is, the candidates set indicates one or more framing techniques each of which, when respectively applied to a data set, enables a typing technique concurrently applied to the framed data set to generate a successful or suitable typing result. In a similar manner, the candidates set may indicate one or more typing techniques upon which one or more tokenization techniques indicated therein depend. In an embodiment, all typing techniques indicated by a candidates set depend on at least one framing technique indicated in the candidates set, and all tokenization techniques indicated by the candidates set depend on at least one typing technique indicated in the candidates set.

In an embodiment, the candidates set corresponds to a family or class of data sets. Different candidates sets may correspond to different classes of data sets. For example, one candidates set may correspond to text data sets or files, another candidates set may correspond to spreadsheet data sets or files, and yet another candidates set may correspond to time series data sets or files. Thus, each candidates set may indicate, for a given class of data sets, a respective subset of the set of known, pre-defined, available or derived parsing techniques that are suitable candidate parsing techniques. Further, the candidates set may indicate the relationships or dependencies between the suitable candidate parsing techniques indicated therein. For example, in an embodiment, upon tokenization indicating the presence of date and time types, and framing which indicates row-wise and column-wise structure, the parsing technique may then conclude the time series candidate set is appropriate. Another candidates set corresponding to text files may include the candidate tokenization and typing techniques that segments data values into days, but may exclude the candidate framing technique that frames a data set into columns.

In an embodiment, the candidates sets, the respective candidate parsing techniques included in each candidates set, and the dependencies between the respective candidate parsing techniques are defined based on human input. In an embodiment, these techniques and candidates are defined over time using supervised or unsupervised learning techniques. In an embodiment, knowledge or evidence gained by the ADP system may influence the set of known, pre-defined or available candidate parsing techniques and/or the definitions of the candidates sets. For example, the ADP system may derive a new parsing technique or a new candidates set based on accumulated knowledge or evidence.

As mentioned above, the ADP system accesses a candidates set to determine the set and/or the order of candidate parsing techniques to evaluate against the target data set, in an embodiment. For example, the ADP system generates a hypotheses set, where the hypotheses set includes a respective hypothesis for each candidate parsing technique indicated by the candidates set. Similar to the candidates set, a hypotheses set may correspond to a class or class of data set, such as text, spreadsheet, binary, etc. However, while a candidates set may define the subset of known, pre-defined or available candidate parsing techniques (and their interdependencies) that are generally suitable for a class of data sets, a hypotheses set may hypothesize, assert, or propose a respective suitability to the target data set of each candidate parsing technique included in the subset, where the hypothesized suitability of each candidate parsing technique to the target data set is based (at least partially) on its interdependencies with other candidate parsing techniques included therein (and as defined by the corresponding candidates set), in an embodiment.

In particular, each hypothesis in a hypotheses set corresponding to a class (generally referred to herein as a "member" of the hypotheses class) may assert or propose that a particular framing, typing, or tokenization technique (or dependent combination thereof) is appropriate for the target data set. For example, a hypotheses member of a text hypotheses class may propose that a particular framing technique is associated with scripting language data sets, and a hypotheses member of a time series hypotheses class may propose that another particular framing technique coupled with which a particular typing technique is associated with stock price data sets.

The probability of hypotheses members being suitable for the target data set may be initially uncertain, because the nature of the target data set may be initially unknown to the ADP system. However, in some embodiments, the ADP system assigns respective confidence indicators to one or more of the hypotheses members, and refines values of these confidence indicators based on evidence that has been accumulated by evaluating various candidate parsing techniques against the target data set. For example, the ADP system refines values of the confidence indicators at least partially in accordance with a Bayesian probabilistic approach.

In an embodiment, each hypothesis of the class hypotheses set that corresponds to a particular candidate parsing technique corresponds to a respective confidence indicator. As such, a value of a particular confidence indicator may be indicative of a measure of confidence that the respective particular candidate parsing technique is applicable to the target data set. For example, the respective particular candidate parsing technique may be included in an actual parsing technique (e.g., an actual framing, typing, and/or tokenization technique) intended by a creator of the target data set. In another example, an "applicable" candidate parsing technique may be a parsing technique that generates a coherent, consistent, or meaningful result when applied to the target data set. In an embodiment, at least some of the confidence indicators may correspond to candidate members of a class. For example, respective confidence indicator may correspond to an XLS member, a CSV member and an Apache™ Hadoop® member of a database or spreadsheet class.

In an embodiment, as discussed above, a single or particular hypothesis may correspond to more than one particular candidate parsing technique. Accordingly, in some scenarios, the set of confidence indicators includes a respective confidence indicator corresponding to a group of candidate parsing techniques, such as a group of interdependent candidate parsing techniques. For example, if the set indicates that tokenization technique A is dependent on typing technique B (e.g., A→B), and that typing technique B is dependent on framing technique C (e.g., B→C), a first confidence indicator may correspond to tokenization technique A, a second confidence indicator may correspond to typing technique B, and a third confidence indicator may correspond to framing technique C. Furthermore, a fourth confidence indicator may correspond to the group of dependent techniques A and B, e.g., the fourth confidence indicator corresponds to A→B, and is indicative of a measure of confidence that A→B is applicable to the target data set to generate a consistent, coherent or meaningful result. Still further, a fifth confidence indicator may correspond to the group of dependent techniques B and C (e.g., the fifth confidence indicator corresponds to B→C), and a sixth confidence indicator may correspond to the group of dependent techniques A, B and C (e.g., the sixth confidence indicator corresponds to A→B→C). In an embodiment, a confidence indicator corresponding to a group of parsing techniques (and/or a value thereof) is based on an aggregation of the individual confidence indicators of the individual parsing techniques included in the group (and/or of the values thereof).

The term "confidence indicator," as used herein, generally refers to the Bayesian probability associated with a specific hypotheses member, where the probability expresses knowledge of the structure, format and/or interpretation of the input data set given that another specific member of a hypothesis class is true. Consequently, the ADP system may update values of confidence indicators corresponding to the hypotheses (and, as such, to their respective candidate parsing techniques) to reflect the likelihood of the candidate technique techniques being applicable to the target data set. For example, the ADP system may revise probability values as additional evidence is accumulated from the results of evaluations of candidate techniques against the target data set.

When the aggregate probability of one or more confidence indicators meets certain conditions, the ADP system may determine that a subset of candidate parsing techniques are suitable, sufficient or optimal parsing techniques for the target data set. For example, if the probability of a value of a specific confidence indicator corresponding to a specific dependent group of techniques including a specific framing, typing and tokenization technique meets a certain condition (e.g., surpasses a threshold), the ADP system determines that the specific framing, typing and tokenization technique is applicable to the target data set. In some embodiments, the ADP system may determine that multiple candidate framing, typing and/or tokenization techniques are applicable to a target data set. In these scenarios, the ADP system may perform a relative comparison of values of confidence indicators amongst the multiple candidate techniques to determine relative suitability between the multiple techniques.

FIG. 1 is a block diagram of an example system 100 for automatically determining an appropriate parsing technique for a target data set. In an embodiment, the system 100 may also parse the target data set according to the determined parsing technique. The system 100 includes an automated data parsing (ADP) system 102. As described in more detail below, the ADP system 102 is configured to automatically determine, in some embodiments, framing, typing, and tokenization techniques that apply to the target data set. The goal of parsing the target data set is to understand semantics of the target data set. For example, given a delimited file which contains stock market data, the ADP system 102 may detect that the file is columnar in structure, that the values are delimited by the string "ABCD," and that the column data correspond, respectively, to the date in the format "YYYY-MM-DD" and the price in British Pounds. In some cases, the ADP system 102 determines an optimal parsing technique for the target data set, where the optimal parsing technique comports with or is equivalent to an actual parsing technique intended by the creator of the data set. In some cases, the ADP system 102 determines one or more sufficient parsing techniques that, when each applied to a target data set, each produces a meaningful, consistent, and/or compatible parsed data set. A set of sufficient parsing techniques for a target data set as determined by the ADP system may or may not include the actual parsing technique intended by the creator of the data set.

The system 100 may include a user computer or computing device 105 communicatively coupled to the ADP system 102 via a communication network 108. The communications network 108 may include one or more of a local area network (LAN), a wireless LAN, a wide area network (WAN), a mobile communications network, the Internet, or any other suitable public or private wired or wireless communication network.

In an embodiment, a user may input, upload, or otherwise indicate or identify a target data set 110 via a user interface at the computing device 105. The user interface may be included in, for example, a web interface or a client of the ADP system 102 executed by one or more processors of the computing device 105. The target data set 110 may be delivered from the computing device 105 via the network 108 to the ADP system 102, in an embodiment. The target data set 110 is interchangeably referred to herein as an input data set to the ADP system 102. In another embodiment, he ADP system 102 may be exposed to external client applications via an API.

The target data set 110 may include a set of data entries 112. The data entries 112 may include one or more of natural language characters or strings, symbolic data such as numeric or alphanumeric characters and expressions, unicode, graphs, images, and/or other data. The data entries 112 may be arranged in any structured, semi-structured, or unstructured format. Indeed, for the data entries 112 of the target data set 110 to be operated on by the ADP system 102, the ADP system 102 is not required to have a priori knowledge of the structure, format, or context of the input data set 110, in some embodiments. The ADP system 102 not only need not know the structure, format, or context of the target data set 110, but the target data set 110 need not include (e.g., may exclude) any information identifying the context, identity, or category of the data entries, such as a header or labels, in some embodiments and/or scenarios. Instead, the ADP system 102 may automatically analyze the data entries 112 and their interrelationships, and may automatically determine the structure, format, and/or meaning of the data entries 112 based upon an ongoing or prior analysis, or by reference to semantic knowledge contained within other systems. For example, a user may utilize a private or custom data file structure, format, and/or segmentation in a target data set, and the ADP system 102 may automatically determine a suitable parsing technique for the target data set in spite of the private or customized file configuration or set. As such, the input data set 110 is not required to be of an identified, pre-defined or a priori known structure, format, and/or segmentation at all (such as Microsoft Excel®, Structured Query Language (SQL), Apache Hadoop®, etc.), although in some embodiments the input data set 110 may be of a known structure, format, and/or segmentation.

Generally speaking, the data entries 112 included in the input data set 110 may only be required to be, at a minimum, arranged or grouped in some consistent manner so that the ADP system 102 is able to determine or deduce a structure of the input data set 110, in an embodiment. That is, the input data set 110 is only required to be in a consistent, structured or semi-structured set, in some embodiments. As such, the ADP system 102 may be able to properly parse the target data set 110 whether or not the input data set 110 includes context or category information (e.g., headings). Consequently, the input data set 110 may include any number of header rows or columns that include context, identity, and/or category information, such as zero, one, two, or more header rows and/or columns. In another embodiment, the input data set 100 may contain incorrect, misplaced, or misleading headings that the ADP system 102 is able to recognize as such. That is, the ADP system 102 can correct invalid, incorrect, incomplete, or misleading structure in some embodiments.

In an embodiment, an evaluator 115 of the automated data parsing system 102 may receive the input or target data set 110. An evaluator manager 116 of the evaluator 115 may access a technique data storage area 117 to determine a hypotheses set for the target data set 110. The technique storage area 117 may be included in the ADP system 102 (e.g., as denoted by reference 117*a*) and/or the technique storage area 117 may be remotely located (e.g., as denoted by reference 117*b*), and is generally referred to herein as technique data storage 117. In an embodiment, the technique storage area 117 stores information that is indicative of, is descriptive of, and/or defines a set of known, pre-defined or available set of parsing techniques, and stores information that is indicative of, is descriptive of, and/or defines one or more candidates sets. For example, the technique storage area 117 includes data indicating or identifying the subset of available parsing techniques corresponding to each candidates set and their respective dependencies with respect to the each candidates set. Such information is collectively referred to herein as technique data 118, and is denoted in FIG. 1 by references 118*a* and 118*b*.

The technique data 118, in addition to specifying the set of known parsing techniques and candidates sets, may also delineate classes of candidates sets, for example, by common file groups encountered by data analysis tools, such as text, tabular data, binary, image, three-dimensional geometry and modeling, audio, scientific and medical, chemical, mathematical, document, etc. Members of a text class set, for example, may be associated with various kinds of text data sets such as books, publications, scripting language, etc. In an implementation, the classes of candidates sets and their corresponding members may have been defined and generated based on information obtained by human curators and/or generated over time via supervised or unsupervised learning techniques. Indeed, in an embodiment, knowledge gained by the ADP system 100 may be saved or added to the technique data 118 to add to or change data corresponding to candidates sets.

The evaluator 115 determines a hypotheses set for the target data set 110 by determining a least a subset of the set of known, determined or available parsing techniques indicated in the techniques data 118. In an embodiment, the evaluator 115 determines the hypotheses set for the target data set 110 to include all available parsing techniques included in the techniques data 118.

In an embodiment, the evaluator 115 determines the hypotheses set for the target data set 110 to include a subset of all available parsing techniques included in the techniques data 118. In an example, the evaluator 115 determines, based on a characteristic of the target data set 110, the hypotheses set to include a subset of all available parsing techniques that correspond to a class, e.g., the hypotheses set indicates all candidate parsing techniques of a candidates set corresponding to the class. For instance, the evaluator 115 determines that a target data set 110 belongs to a spreadsheet class when a file name of the target data set 110 includes an ".xls" extension, and/or when the evaluator 115 detects column headers.

Additionally or alternatively, the evaluator 115 determines the subset of available parsing techniques based on other criteria, such as a maximum number of initial candidate parsing techniques, previous target files entered by the user, a maximum predicted time of execution, by random selection, or other criteria, in an embodiment.

In some embodiments, the evaluator 115 establishes initial values of confidence indicators corresponding to the candidate parsing techniques associated with the hypotheses set. A value of a particular confidence indicator may indicate a probability (e.g., a Bayesian probability) that the input data set 110 is arranged (e.g., structured, formatted, and/or segmented) in such a manner that a corresponding particular parsing technique is applicable to the input data set.

In an example scenario, the evaluator manager 116 may establish a 70% confidence indicator associated a first hypothesis class member, a 20% indicator of confidence associated with a second hypothesis class member, and a 10% confidence indicator associated with a third hypothesis class member. For example, the first hypothesis class member may correspond to a candidate framing technique associated with HyperText Markup Language (HTML) files, and the second hypothesis class member may correspond to a candidate framing technique associated with scripting language files, etc. Further, in an embodiment, the evaluator manager 116 generates multiple confidence indicators corresponding to members of multiple hypothesis classes. For example, the evaluator manager 116 may establish a 50% confidence indicator for a member of a text class of hypotheses (HTML, publication, script, etc.) and a 10% confidence indicator for a member of an imagery class of hypotheses (e.g. Scalable Vector Graphics (SVG), Joint Photographic Experts Group (JPEG), etc.). In an embodiment, the evaluator manager 116 normalizes the values of the confidence indicators, such that the total confidence indicator value is unity, or 100%.

As mentioned, values of the initial confidence indicators of the ADP system 102 may reflect the Bayesian probability that respective candidate parsing techniques are applicable to the target data set 110, and are not indicative of probabilities associated with a well-defined chance of the target data set 110 being a certain kind of data set (e.g., the probability that the target data set 110 has a certain structure, formatting, and/or segmentation). As such, the evaluator manager 116 may generate the initial confidence indicators in any suitable way. In some embodiments, the initial confidence indicators may be generated based on historical or accumulated reference data. For example, the ADP system 102 may accumulate reference data associated with past data files uploaded to the ADP system 102 from the user computer 105, and the evaluator manager 116 may establish initial confidence indicators by performing a statistical analysis of the accumulated reference data and comparing the analysis results to characteristics of the input data set 110, for example. However, the ADP system 102 does not require previously accumulated reference data to establish initial confidence indicators. In fact, in an embodiment, all of the initial confidence indicators may be arbitrarily, or otherwise, established as equal confidence indicators and subsequently refined by the evaluator 115. As discussed below with reference to FIG. 7, an accurate set of initial confidence indicators may increase system efficiency, where accuracy implies that the initial confidence indicators are close to the eventually refined confidence indicators. However, at least in some embodiments, the ADP system 102 does not require accuracy in the set of prior confidence indicators. Rather, the ADP system 102 simply arbitrarily defines prior confidence indicators in a suitable way, according to an embodiment.

In an embodiment, the evaluator manager 116 uses subjective models to establish initial confidence indicators. A subjective model, for example, may attempt to predict characteristics of a data set resulting from a specific data set creation process. A subjective model for stock price data set, for example, may assume that the creators of stock price data sets commonly use certain file types, delimiters, characters, and structures, and, moreover, may include certain inconsistencies in a stock price data set. A subjective model need not be based on reference data. Thus, by using subjective models, the usefulness of the ADP system 102, in some embodiments, does not depend on the availability of large sets of reference data.

In an embodiment, the evaluator manager 116 determines initial values for confidence indicators corresponding to candidate members of a class. For example, the evaluator manager 116 may assign initial values to confidence indicators corresponding to an XLS member, a CSV member and a Hadoop member of a database or spreadsheet class.

The evaluator manager 116 may store an indication of the initial values of the set of confidence indicators associated with hypothesis class members in a confidence register 130, which may be included in any suitable non-transitory computer readable storage medium or media that is accessible to the evaluator manager 116. For example, the evaluator manager 116 may assign the following confidence indicators to respective members: (1) 40% confidence in a parsing technique associated with HTML data sets; (2) 10% confidence in a parsing technique associated with scripting language data sets; (3) 10% confidence in a parsing technique associated with natural language data sets from publications; and (4) 5% confidence in a parsing technique associated with UCS Transformation Format-8-bit (UTF-8) data sets. The remaining 35% confidence indicators may be assigned to other members. These example confidence indicators may be stored in the confidence register 130 as numbers 0.40, 0.10. 0.10, and 0.05 and as corresponding to their respective hypothesis class members, where the respective members may be represented by, or associated with the confidence indicators using, identification numbers, text, pointers or any other appropriate representation.

The evaluator manager 116 determines, based on current values of confidence indicators in the confidence register 130, a set of promising hypothesis class members to be evaluated against the target data set 110 (i.e. candidate parsing techniques), in an embodiment. For example, the evaluator manger 116 may select a pre-defined number of members with the highest confidence indicators, or the evaluator manager 116 may dynamically determine an appropriate number of members to be evaluated based on file size, available computational resources, etc. In an embodiment, the evaluator manager 116 may determine or select the set of hypotheses class members without consideration to the current values of the confidence indicators, e.g., arbitrarily or randomly, or the evaluator manager 116 may select all hypotheses members corresponding to a parsing sub-technique.

In an embodiment, the evaluator manager 116 instructs a framing engine 120 to apply candidate parsing techniques corresponding to the determined members to at least a portion of the target data set 110. For example, the framing engine 120 may receive, from the evaluator manager 116, an indication of the at least the portion of the target data set 110 and an indication of one or more hypothesis class members to be evaluated. The framing engine 120, in some embodiments, applies the corresponding candidate framing techniques to the at least the portion of the target data set 110.

In an embodiment, the evaluator manager 110 identifies the corresponding framing techniques to the framing engine 120, and in an embodiment, the framing engine 120 determines the corresponding framing techniques, e.g., by accessing the corresponding candidates set in the technique data 118.

In a simple example scenario, the confidence register 130 indicates an 80% confidence indicator for a CSV member of a spreadsheet class, and a 20% confidence indicator for a Microsoft Excel® member of the spreadsheet class. Based on these confidence indicator values, for the hypotheses set corresponding to the target data set 110, the evaluator manager 116 may instruct the framing engine 120 to evaluate one or more respective candidate framing techniques corresponding to a Microsoft Excel® member, one or more respective candidate framing techniques corresponding to a CSV class member, or respective candidate framing techniques for both the Microsoft Excel® member and the CSV class member. In some situations, the evaluator manager 116 may ignore the relatively low confidence of the Microsoft Excel® member, and may instruct the framing engine 120 to frame according to one or more candidate framing techniques associated with the relatively high confidence CSV hypothesis class member.

In an embodiment, the framing engine 120 applies the candidate framing techniques to frame at least a portion of the target data set 110 based on technique attributes 119a and/or 119b corresponding to the candidate framing techniques (generally referred to herein as technique attributes 119). Generally, each candidate parsing technique (e.g. candidate framing, typing, and tokenization technique) may have one or more respective attributes 119 associated therewith. The attributes of a particular candidate parsing technique may define one or more rules associated with applying the particular candidate parsing technique. For example, the technique attributes 119 may define one or more parameters of a data set that are necessary or sufficient to successfully apply the particular candidate parsing technique to a data set. In an example, the technique attributes 119 may define one or more scripts or functions that may be executed in order to apply the particular candidate parsing technique to a data set.

As such, the technique attributes 119 indicate the necessary attributes for an engine to apply a corresponding candidate parsing technique, in an embodiment. In the above simple example, the technique attributes 119 corresponding to the CSV candidate framing techniques may define rules associated with commas, spaces, and carriage returns that are utilized by the framing engine 120 to apply the CSV candidate framing techniques. In some embodiments, the technique attributes 119 include one or more scripts that may be executed in order to apply a candidate parsing technique. For example, the technique attributes 119 may include an English language framing script that, when executed, appropriately frames a Charles Dickens novel.

In some embodiments, the evaluator manager 116 or the framing engine 120 determines the one or more candidate framing techniques to be evaluated on the target data set 110 based on measures of suitability. Assuming, based on a value of a respective confidence indicator, that the target data set is certain kind of data set (i.e. a certain hypothesis class member), multiple candidate framing techniques may be associated with that certain kind of data set, as defined by the respective candidates set. Furthermore, each candidate framing technique may have a corresponding measure of suitability for the certain kind of data set, as also defined by the respective candidates set. The measure of suitability may be a measure of the candidate framing technique being an appropriate framing technique for that certain kind of data set. For example, assuming that, for the target data set 110, a value of a confidence indicator corresponding to "CSV member" is above a certain threshold, e.g., 80%, a candidate framing technique including comma-based rules may have a 0.7 measure of suitability, whereas a candidate framing technique including comma- and tab-based rules may have a 0.2 measure of suitability. In some embodiments, the measures of suitability are pre-defined by human curators. In other embodiments, the measures of suitability are developed over time based on statistical analysis of user activity, accumulated reference data, etc. In an embodiment, the ADP system 100 may refine levels of suitability based on evidence accumulated from performing evaluations.

The framing engine 120 may match hypothesis class members with one or more candidate framing techniques, e.g., the most suitable candidate framing techniques or a given number of suitable candidate framing techniques. Upon matching one or more members with one or more candidate framing techniques respectively, the framing engine 120 frames part of or all of the target data set 110 using the matched candidate framing techniques. For example, multiple instances of the framing engine 120 may individually apply individual candidate framing techniques to respective portions of the target data set 110. In some cases, one or more of the candidate framing techniques may not be appropriate for the target data set 110, even though they may have been selected based on a high confidence indicator. The framing according to those candidate framing techniques, which are not appropriate for the target data set 110, may generate errors, stall, or generate unexpected output. On the other hand, one or more of the candidate framing techniques may execute suitably or successfully and produce rich, meaningful, consistent, comprehensible, compatible, or otherwise useful output. In response to either favorable (rich, meaningful, consistent, compatible, applicable, comprehensible, etc.) or unfavorable output (error, unexpected, inconsistent, incompatible, inapplicable, incomprehensible, etc.), as characterized by an end user, from framing part of or all of the target data set (e.g., based on the results of the evaluation of the candidate framing technique against the target data set 110), the evaluator manger 116 may update the initial values of the confidence indicators in the confidence register 130. Thus, as hypothesis class members are "evaluated," results or additional evidence are generated (favorable or unfavorable output), and values of confidence indicators are refined based on the results or additional evidence, in an embodiment. In some embodiments, the evaluator manger 116 may update the initial confidence indicators associated with one or more hypothesis class members that have not yet been evaluated based on evidence from evaluating another hypothesis class member. This updating process may involve backtracking to a prior evaluation, and resuming from that point.

In some embodiments, specific members are associated with specific conditions that provide a measure of favorable and unfavorable framing, typing, and tokenization output. Conditions for favorable and unfavorable output may be a discrete "favorable" or "unfavorable" indication (e.g. "yes" or "no," "true" or "false," 1 or 0), or a continuous measure of favorable and unfavorable output (e.g. a number between 0 and 1, a percent), for example. In an example scenario, a discrete measure of favorable or unfavorable framing output for a tabular data member may indicate whether a non-zero number of columns and rows are detected. If a non-zero number of columns and rows are detected, the framing engine 120 indicates a favorable output ("yes," "true," 1, etc.), whereas if no columns or rows are detected the framing engine 120 would indicate an unfavorable output ("no," "false," 0, etc.). On the other hand, a continuous indication of favorable or unfavorable framing output, in the example case of a tabular data member, may be a measure proportional to the ratio of detected columns to rows, where tabular data with multiple columns may be determined to be more interesting output, for example. If one column and one hundred rows are detected (i.e. a one column table) the framing engine 120 may indicate a measure a favorable or unfavorable framing output proportional to 1/100, whereas if ten columns and one hundred rows are detected the framing engine 120 may indicate a measure of favorability proportional to 10/100 or 1/10.

For the simple example above, the evaluator manager 116 evaluates one or more candidate framing techniques associated with CSV spreadsheets and one or more candidate framing techniques associated with Microsoft Excel® spreadsheets, in some embodiments. If one or more of the CSV candidate framing techniques produces favorable output, and all of the Microsoft Excel® candidate framing techniques produce unfavorable output, for example, the evaluator manager 116 may increase the confidence indicator associated with the CSV member from 80% to 87% and may decrease the confidence indicator associate with the Microsoft Excel® member from 20% to 13%, as an illustrative example. The updated values of the confidence indicators may be determined by any appropriate method known in the art, such as by using an implementation of Bayes' theorem, for example.

Based on the refined or updated confidence indicators and the newly accumulated evidence from the framing engine 120 (i.e. information regarding the favorability of the framing results), the evaluator 115 may determine further members of the hypothesis class tree for evaluation. The newly determined members may, for example, be candidate framing techniques and/or candidate typing techniques included in the same class or in a different class. For example, the evaluator manager 116 may transition from evaluating an initial hypothesis class member, associated with framing CSV spreadsheet data sets, to evaluating a member of the hypothesis class tree prescribing framing and typing techniques associated with CSV spreadsheets.

Moreover, in some embodiments, the evaluator 115 may transition from evaluating a single hypothesis class member to evaluating multiple other hypothesis class members with corresponding confidence indicators. For example, the evaluator 115 may transition from evaluating the above mentioned CSV hypothesis prescribing a candidate framing technique, to the evaluation of three other hypotheses prescribing framing and typing techniques: (1) a candidate framing technique for CSV data sets and a candidate typing technique appropriate for one column of dates and one column of names; (2) a candidate framing technique for CSV data sets and a candidate typing technique appropriate for one column of names and one column of email addresses; and (3) a candidate framing technique for CSV data sets and a candidate typing technique appropriate for one column of times and one column of monetary values. In such embodiments/scenarios, the confidence indicators associated with the newly evaluated hypothesis members may be conditional confidence indicators. For example, given a candidate framing technique for CSV data sets, the evaluator manager 116 may assign a conditional confidence indicator of 30% to a dependent candidate typing technique appropriate for one column of dates and one column of names, 20% to a dependent candidate typing technique appropriate for one column of names and one column of email addresses, etc. As with the initial confidence indicators, conditional confidence indicators may be refined over time, and are not necessary initially based on reference data.

The evaluator manager 116 determines a certain number of hypotheses (e.g., hypotheses that include candidate typing techniques) for further evaluation against the target data set 110 and provides conditional confidence indicators, along with framed portions of the target data set 110, to a typing engine 140, in an embodiment. The typing engine 140 may receive framed portions of the target data set 110 and may apply one or more of the indicated candidate typing techniques to framed portions of the target data set 110. For example, the typing engine 140 may match a pre-defined number of candidate typing techniques with the highest conditional confidence indicators, may select candidate typing techniques with conditional confidence indicators above a threshold, may dynamically determine an appropriate number of candidate typing techniques to be evaluated based on file size, available computational resources, etc.

In an embodiment, the typing engine 140 may utilize fuzzy set statements defined in the technique attributes 119 to type data sets. Fuzzy set statements used by the typing engine 140 may take one or more data entries as input and output a fuzzy probability, where a fuzzy probability indicates the likelihood that the one of more data entries correspond to a certain format, or type. As an illustrative example, a fuzzy set statement corresponding to a time format may take, as input, a numeric data entry, may execute one or more analyses on the data entry to determine if the data entry is likely to be a time entry, and may output a fuzzy probability, where the fuzzy probability indicates the probability that the data entry is in a time format. In an example scenario, the fuzzy set statement corresponding to a time format may check if the data entry contains positive integer numbers separated by a colon, and optionally whether the data entry includes the symbols "AM" and/or "PM." The fuzzy set statement may then compare the results of this integer/symbol test with equivalent checks for a set of common time entries and generate a continuous measure of probability indicating the likelihood of the data entry being a time format data entry.

In another embodiment, one or more of the typing techniques used by the typing engine 140 utilize Bloom filter scripts in the technique attributes 119. A Bloom filter script may include computer executable instructions that, when executed by one or more processors, determine if an element is present in a set, for example. Used by the typing engine 140, a Bloom filter script may receive one or more data entries in the target data set 110 and determine if the data entry is included in a reference set. For example, a Bloom filter script corresponding to a color format may determine if a text data entry is contained in a set of known colors (e.g. red, green, blue, etc.).

The typing engine 140 may match multiple candidate typing techniques, such as those related to fuzzy set statements or Bloom filter scripts, to multiple hypotheses with high conditional confidence indicators. Once matched, the typing engine 140 may type the framed portions of the target data set 110 according to the matched candidate typing techniques. For example, the typing engine 140 may type data entries in one column of the target data set 110 using a fuzzy set statement corresponding to a name format and a fuzzy set statement corresponding to a date format while data entries in a second column are typed using a fuzzy set statement corresponding to an email format and a fuzzy set statement corresponding to a time format. In this example scenario, the typing engine 140 generates fuzzy set probabilities corresponding to name and date formats for one column and email and time formats for a second column.

The evaluator manager 116 may refine the conditional probabilities associated with hypotheses and stored in the confidence register 130 based on the output of typing with the matched candidate typing techniques, in an embodiment. Fuzzy probabilities, for example, may be used to update the conditional probabilities in the confidence register 130. Based on the refined conditional confidence indicators and newly accumulated evidence from the typing engine 140, the evaluator manager 116 may transition from the evaluation of certain hypotheses prescribing candidate framing and typing techniques to the evaluation of other hypotheses prescribing candidate framing, typing, and tokenization techniques, in an embodiment. As an illustrative example, the evaluator manager 116 may transition from evaluating one hypothesis prescribing candidate framing and typing techniques appropriate for a CSV spreadsheet with one column of dates and a second columns of names, to the evaluation of a second hypothesis prescribing candidate framing, typing, and tokenization techniques for a CSV spreadsheet with one column of dates in the form of "month/day/year" and a second column of names in the form of "last name, first name." Further, in some embodiments, the evaluator manager 116 may transition from evaluating a first number of hypothesis class members to the evaluation of a second number of members, where the second number of members may be less than or greater than the first number of members and the second number of members may prescribe any of framing, typing, and/or tokenization techniques.

Based on previously performed evaluations, the evaluator manager 116 may determine a certain number of hypothesis class members (e.g., members including candidate tokenization techniques) to be further evaluated, may select members with confidence indicators above a threshold, and/or may dynamically determine an appropriate number of members to be evaluated based on file size, available computational resources, etc. The evaluator manager 116 may provide the determined members and corresponding conditional confidence indicators, along with framed and typed portions of the target data set 110, to a tokenization engine 150. The tokenization engine 150 may receive framed and typed portions of the target data set 110 and apply one or more candidate tokenization techniques to framed and typed portions of the target data set 110, in an embodiment. For example, the tokenization engine 150 may match a pre-defined number of hypotheses (e.g., corresponding to candidate tokenization techniques) with the highest conditional confidence indicators, may select members with confidence indicators above a threshold, and/or may dynamically determine an appropriate number of members to be evaluated based on file size, available computational resources, etc., as determined by the evaluator manager 116.

In an embodiment, the candidate tokenizing techniques used by the tokenization engine 150 may include signatures and finite, indexed grammars for the tokenization of textual data. A signature may include a unique type of data entry attribute. For example, a bitmask signature may be used to count instances of characters in a data entry or an n-enumeration signature may enumerate all possible n-word subsequences of words in a data entry. A grammar represents rules for recognizing strings of characters in a language, where the language may or may not be a natural, or human, language.

For example, a data entry in a country format representing the United States of America may contain at least one of the character strings "United States," "United States of America," "USA," "America," etc., where each of the different character strings representing the country may have unique signatures. A grammar of countries, or a grammar specifically related to the United States of America, may contain an indexed list of signatures commonly used to represent the United States of America, and this indexed list would contain signatures corresponding to each of "United States," "United States of America," "USA," "America," etc. In addition, grammars other than a grammar of countries may contain an indexed list of one or more of the same example signatures. Signatures of "America," for example, could correspond to an indexed grammar of countries or an indexed grammar of song names, such as in the case of "America the Beautiful." Therefore, in an embodiment, the tokenizing engine 150 uses refined/conditional probabilities associated with hypothesis class members to identify particular signature/grammar candidate tokenizing techniques relevant to high confidence hypothesis class members. For example, if a hypothesis class member with a high level of confidence asserts that a column of data entries is countries, the tokenization engine 150 may match that hypothesis class member with a candidate tokenization technique that includes an indexed grammar of countries with corresponding signatures.

In some embodiments, tokenization techniques are developed dynamically based on sampling data entries in the target data set 110. In an example scenario, the tokenization engine 150 may sample a subset of data entries in each column of a tabular data set. The tokenization engine 150 may analyze these data entries in detail using signatures and grammars, or any other appropriate tokenization technique, for example, and develop rules for tokenizing the remaining entries in the respective columns of the tabular data set. In an embodiment, dynamically created rules may be stored and applied to tokenize the whole of the target data set 110, assuming the dynamically created tokenization rules are determined to be part of the appropriate parsing technique. Additionally, information corresponding to the dynamically created candidate tokenization technique may be added to the technique data storage 117.

The tokenization engine 150 may match multiple candidate tokenization techniques, such as those containing signatures and indexed grammars, to multiple hypothesis class members with high conditional confidence indicators. Once matched, the tokenization engine 150 may tokenize the framed and typed portions of the target data set 110 according to the matched tokenization techniques, and may refine the conditional confidence indicators associated with the hypothesis class members, stored in the confidence register 130, based on the output of tokenization with the matched tokenization techniques.

In some embodiments, the framing, typing, and tokenization engines 120, 140, 150 operate on a subset of the target data set 110. In such embodiments, the evaluator manager 116 may determine, based on refined conditional confidence indicators and/or the richness, usefulness, diversity, etc. of the tokenized data, if a certain hypothesis class member meets a particular condition, e.g., has a particularly high confidence indicator value. More particularly, the evaluator manager 116 may determine if the specific framing, typing, and tokenization techniques, associated with a high confidence hypothesis class member, are appropriate for the target data set 110 based on one or conditions, e.g., a measure of coherence or incoherence, a measure of compatibility or incompatibility, a measure of comprehensibility or incomprehensibility, a measure of consistency or inconsistency, etc. If appropriate techniques exist, the evaluator manager 116 may choose to frame, type, and tokenize the entire target data set 110 by using the framing engine 120, typing engine 140, and tokenizing engine 150 according to the determined parsing techniques, e.g., by using a parsing execution engine 155. The parsing execution engine 155 may or may not be included in the ADP system 102. The evaluator manager 116 may then output a parsed (framed, typed, and tokenized) data set to an application, such as to an API, to a user interface application at the user computer 105, and/or to a data analysis application at a data analysis system. However, if appropriate techniques are not yet determined, the evaluator manager 116 may initiate further evaluation of other hypothesis class members. An example method of determining a clear choice of framing, typing, and tokenization techniques is further discussed with reference to FIG. 7.

In some embodiments, the ADP system 102 sends a parsed data set 160 to a data analysis system 165, where the parsed data set 160 corresponds to the output of framing, typing, and tokenizing the target data set 110 with appropriate or applicable techniques. The data analysis system 165 performs one or more analyses on one or more parsed data entries 170 in the parsed data set 160, in an embodiment. For example, the data analysis system may generate visualizations, such as scatter plots, matrix charts, network diagrams, bar charts, block histograms, bubble charts, etc. or other computational analyses, such as integration, differentiation, Fourier analysis, symbolic manipulation and numeric analysis, regression, etc. In some embodiments, the data analysis system 165 may be an automated data analysis system such as described in U.S. application Ser. No. 13/763,568, entitled "Automated Data Analysis" and filed on Feb. 8, 2013, the entire disclosure of which is hereby incorporated by reference herein.

Figure 2A:
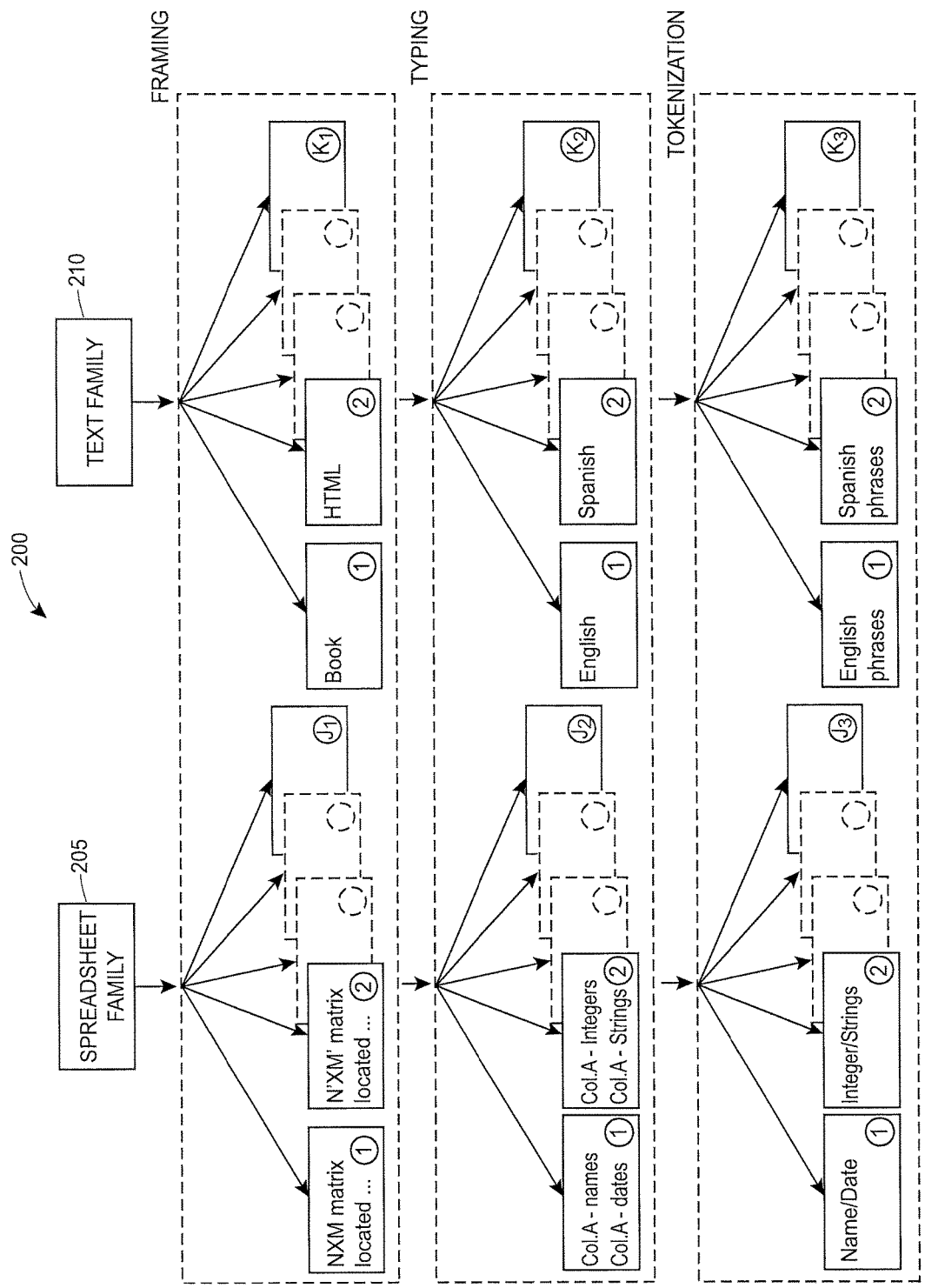
FIGS. 2A-2B illustrate an example tree of hypothesis class members.
Figure 2B:
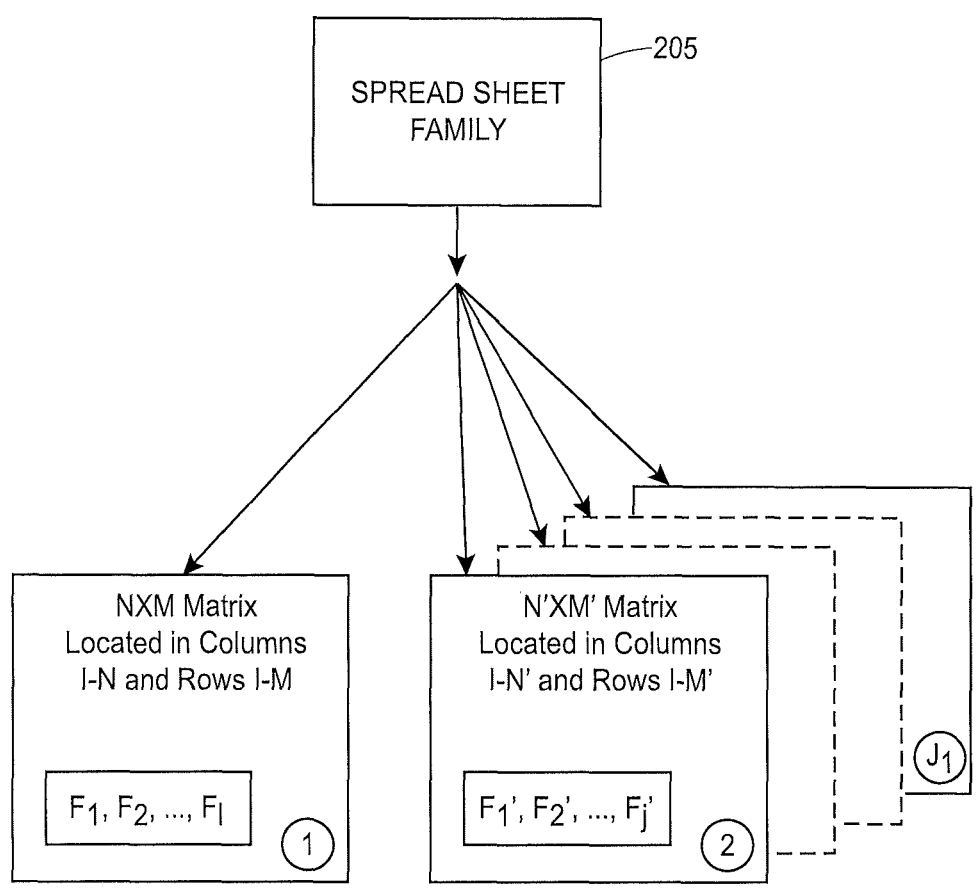

FIGS. 2A and 2B illustrate an example tree of parsing possibilities (i.e. possible framing, typing, and tokenization techniques). In an embodiment, the tree of parsing possibilities is a hypotheses set, such as a hypotheses set discussed with respect to FIG. 1. In an embodiment, the example tree of FIGS. 2A and 2B may be explored to determine suitable parsing techniques for a target data set. For example, at least portions of the system 100 may explore the tree of FIGS. 2A and 2B, or other suitable systems may explore the tree.

With respect to FIGS. 2A and 2B, the parsing possibilities are referred to as "members" of a "hypothesis tree." FIG. 2 illustrates an example hypothesis tree, where members of the hypothesis class tree 200 are each associated with a specific class of parsing techniques (text, spreadsheet, etc.). In this example case, a spreadsheet hypothesis class 205 and a text hypothesis class 210 define specific candidate framing, typing, and tokenization techniques related to spreadsheet data sets and text data sets respectively. Although two example hypothesis classes are illustrated in FIGS. 2-6, an ADP system, such as the ADP system 102, may explore any number of suitable hypothesis classes, including hypothesis classes different than the hypothesis classes illustrated in FIGS. 2-6.

The example hypothesis classes 205 and 210, in some embodiments, may include hypothesis class members prescribing candidate framing, typing, and tokenization techniques. For example, the hypothesis classes 205 and 210 may include hypothesis class members with associated candidate framing techniques ($1-J_1$ and $1-K_1$ respectively), hypothesis class members with associated candidate typing techniques ($1-J_2$ and $1-K_2$ respectively), and hypothesis class members with associated candidate tokenization techniques ($1-J_3$ and $1-K_3$ respectively). An evaluator manager may assign initial confidence indicators to each respective member, only members on certain levels, or any subset of hypothesis class member, for example.

Each hypothesis class may have a potentially large number of member, or associated candidate framing, typing, and tokenization techniques. For example, FIG. 2B illustrates a specific level of the example hypothesis class tree 200, where multiple hypothesis class members $1-J_1$ are each associated with multiple respective candidate framing techniques, $\{F_1, F_2, \ldots, F_I\}$, $\{F'_1, F'_2, \ldots, F'_j\}$, etc. An ADP system, e.g., the system 102, in some embodiments, only explores, or evaluates, the parsing "branches," or hypothesis possibilities and associated techniques, corresponding to high confidence indicators. In this way, the ADP system may increase the efficiency of determining an appropriate parsing technique. However, in some embodiments, the ADP system may choose to explore all the branches of a hypothesis tree due to one or more of the nature or size of the input data set, the number of hypothesis class members, available computational resources, etc.

Each of FIGS. 3-6 illustrates an example scenario in which an ADP system evaluates some of the possible hypothesis class members of the hypothesis tree 200. For ease of discussion, components of example ADP system 102 are referred to in the description of FIGS. 3-6. However, it is understood that any ADP system implementing the presently disclosed techniques may evaluate the example hypothesis class members of FIGS. 3-6.

Figure 3:
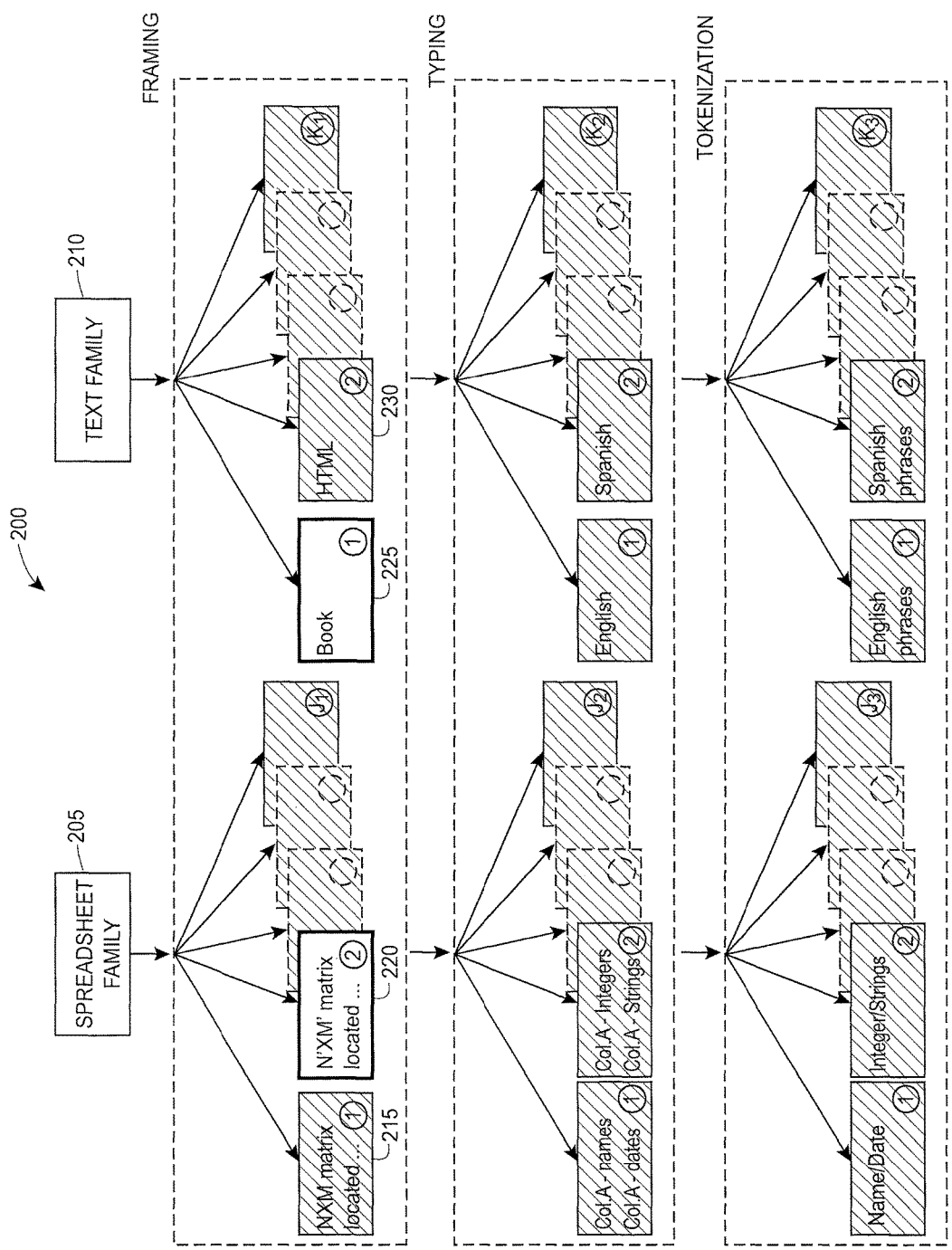
FIGS. 3-6 illustrate example scenarios in which hypothesis class members and corresponding parsing techniques are evaluated.

Specifically, FIG. 3 illustrates an example scenario in which the ADP system 102 begins to evaluate hypothesis class members associated with spreadsheet hypothesis class 205 and the text hypothesis class 210. The evaluator manager 116 generates confidence indicators associated with one or more hypothesis class members, in an embodiment. For example, the evaluator manager 116 may generate a confidence indicator of 5% associated with a candidate framing technique for an N by M matrix located in columns 1-N and rows 1-M of the target data set (hypothesis class member 215), a 20% confidence indicator associated with a candidate framing technique for an N' by M' matrix located in columns 1-N' and rows 1-M' of the target data set (hypothesis class member 220), etc. Further, the evaluator manager 116 may generate a confidence indicator of 50% associated with a candidate framing technique for text portions of a book or publication (hypothesis class member 225), a confidence indicator of 10% associated with a candidate framing technique for HTML data sets (hypothesis class member 230), etc., for example.

Instead of evaluating all the available hypothesis class members illustrated in FIG. 2A, the ADP system 102, in some embodiments, may begin determining an appropriate parsing technique by evaluating only the hypothesis class members with relatively high confidence indicators. For example, hypothesis class member 220 and hypothesis class member 225 may have high confidence indicators with respect to the other hypothesis class members, and the ADP system 102 may evaluate these members first, as represented by bold outlines and arrows in FIG. 3. The evaluation of these hypothesis class members involves framing, by a framing engine such as framing engine 120, part of or all of the input data set according to one or more framing techniques prescribed by each respective member, in an embodiment.

Figure 4:
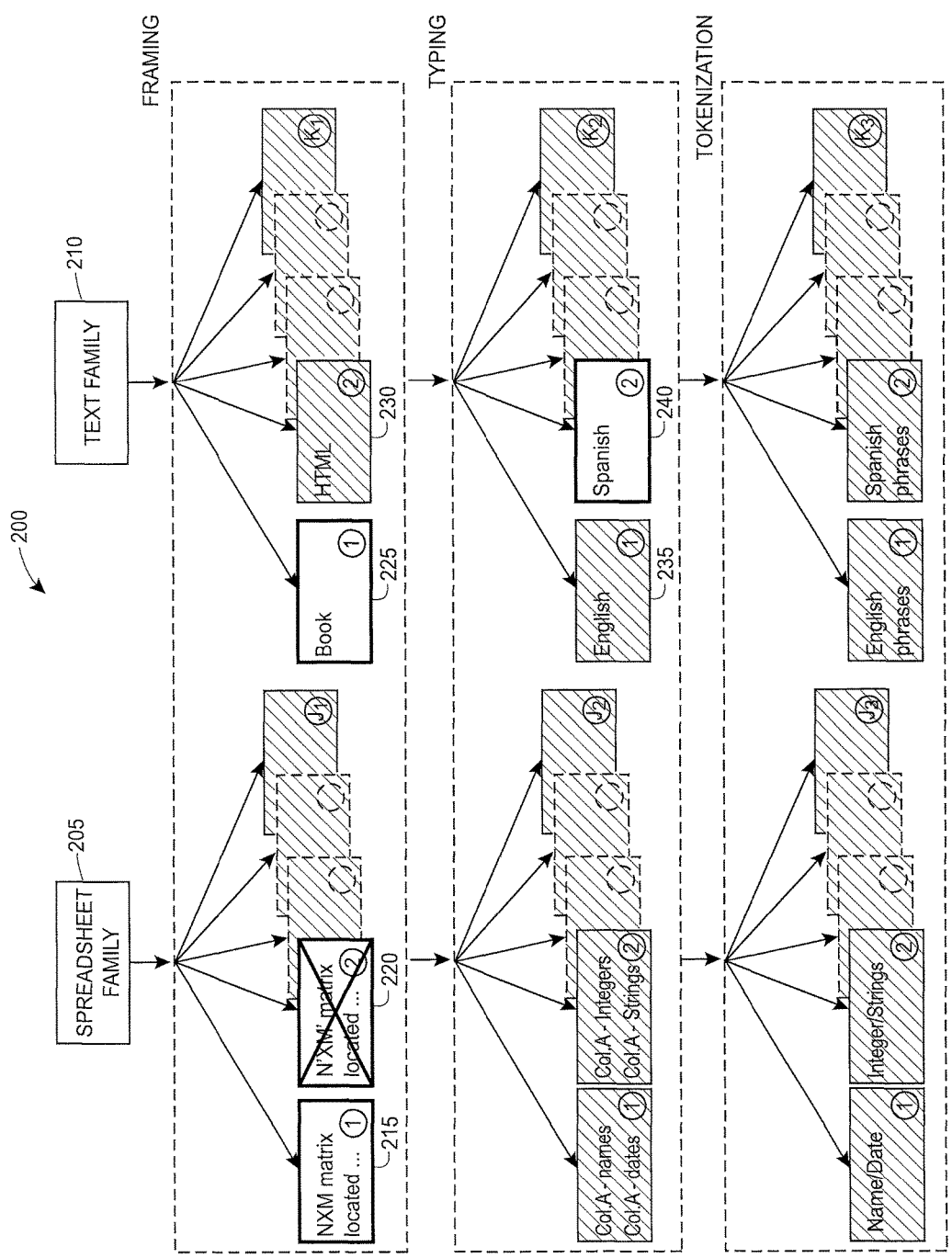

FIG. 4 illustrates an example scenario in which the ADP system 102 has evaluated the example hypothesis class member 220 and the example hypothesis class member 225. In this scenario, framing according to one or more candidate framing techniques prescribed by member 220 produces unfavorable results, whereas framing according to one or more candidate framing techniques prescribed by member 225 produces favorable results. As such, the evaluator manager 116, in this scenario, refines the confidence indicator associated with member 220, in a confidence register such as confidence register 130, and opts to abandon member 220 (indicated by a cross in FIG. 4) in favor of member 215 of the spreadsheet class 205. The framing engine 120 may then evaluate spreadsheet member 215 according to one or more candidate framing techniques prescribed by spreadsheet member 215.

On the other hand, the evaluator manager 116, in the example scenario, refines the confidence indicator associated with member 225 and may transition from evaluating member 225 to evaluating other hypothesis class members. In some example scenarios, the evaluator manager 116 may transition from evaluating member 225 to evaluating multiple other hypothesis class members. For example, given a candidate framing technique associated with book or publication data sets (member 225), the book or publication data set could be typed according to a candidate typing technique for English formats (member 235), a candidate typing technique for Spanish formats (member 240), etc. The typing engine 140 evaluates one or more members by typing according to prescribed candidate typing techniques, in an embodiment. In an embodiment, the evaluator manager 116 refines confidence levels for hypothesis class members yet to be evaluated and/or currently evaluated members based on accumulated evidence, such as obtained from results of previously performed evaluations.

In some embodiments, the evaluator manager 116 develops a priority list to dictate which of the many possible members should be further explored and/or which possible members should be abandoned. For example, a priority list ranks possible members according to refined/conditional confidence indicators in the confidence register 130. Priority lists may also rank possible members according to available computational resources and the computational cost associated with the evaluation of one or more members. For example, the computational cost associated with the evaluation of possible members varies, and the individual candidate framing, typing, and tokenization techniques associated with one member may also have varying degrees of computational cost. The evaluator manager 116, in some embodiments, optimizes the evaluation of hypothesis class member possibilities based on computational cost and available computational resources, in an embodiment, such that an appropriate parsing technique is efficiently determined or a large number of member possibilities are evaluated in a desired time interval.

In an embodiment, the ADP system 102 may explore all branches of the hypothesis tree. That is, the ADP system 102 may evaluate all possible, available, or known parsing techniques included in a technique database 117a or 117b to determine a parsing technique for the target data set 110. However, in some embodiments, the ADP system 102 only evaluates a subset of the possible, pre-defined, available, or known parsing techniques stored in the technique data storage area base 117a or 117b. For example, the evaluator manager 116 may determine an appropriate parsing technique based on high confidence indicators without exploring all branches of the hypothesis tree. Thus, some branches of the hypothesis tree are not evaluated in determining an appropriate parsing technique, in an embodiment.

Figure 5:
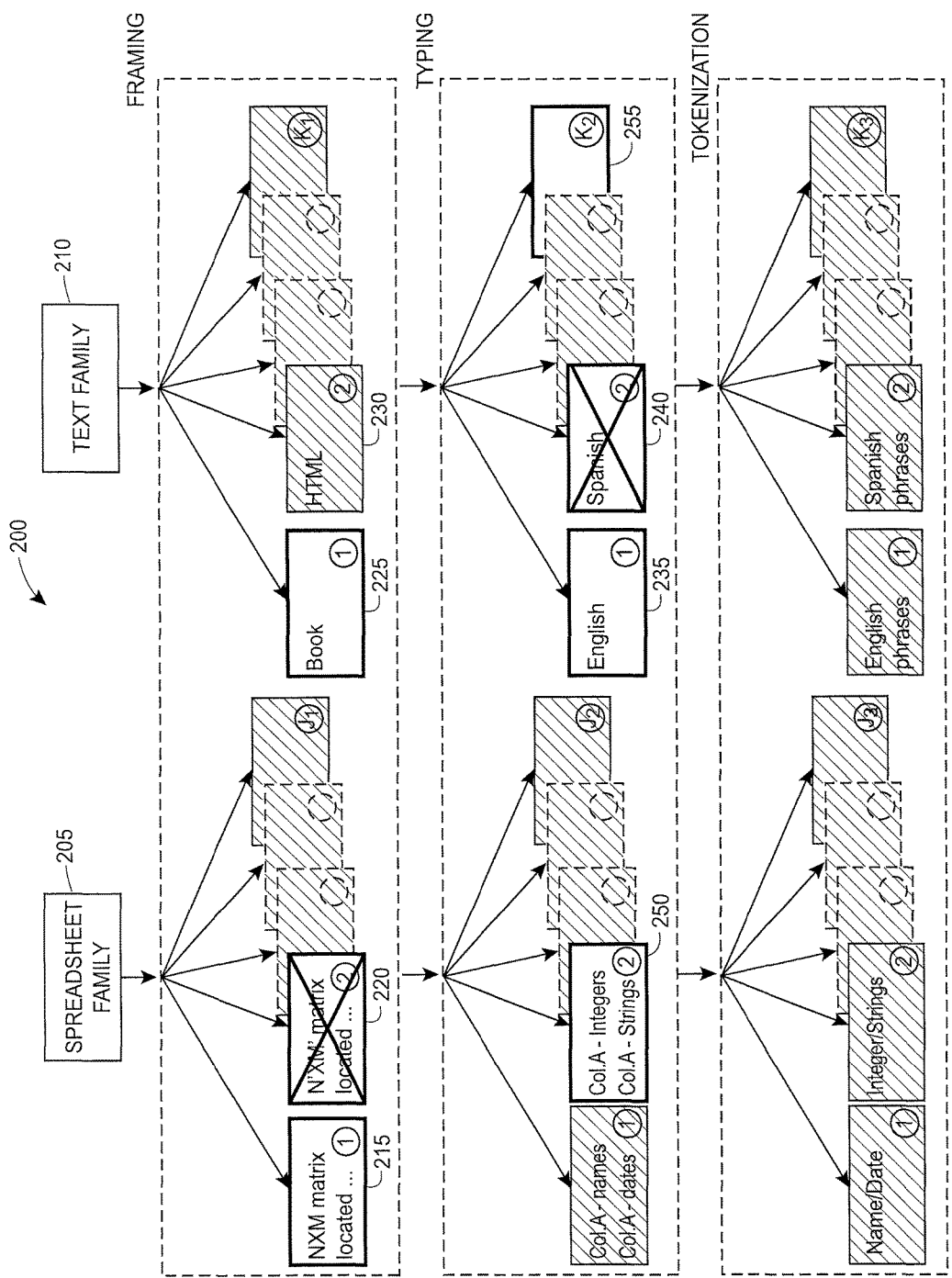

FIG. 5 illustrates an example scenario in which the ADP system 102 further explores the hypothesis class tree 200. In this example scenario, the system 102 transitions from evaluating member 215 to the evaluation of member 250, where the member 250 is evaluated by the typing engine 140. In addition, the evaluator manager 116 may opt to abandon text class member 240 based on unfavorable typing results, for example. In some embodiments, the refining of prior/conditional confidence indicators causes the ADP system 102 to abandon multiple members and/or evaluate multiple other members. For example, the ADP system 102 may abandon member 240 and then explore, or type according to candidate techniques prescribed by two other hypothesis class members 235 and 255.

In some scenarios, the evaluation of branches on the hypothesis tree 200 may include transitions from evaluating tokenization techniques to evaluating framing or typing techniques or from evaluating typing techniques to evaluating framing techniques (e.g., moving back up the hypothesis tree 200 or "backtracking"). The evaluator manager 116 may initiate these transitions based on the favorability of typing and/or tokenization output, refined confidence indicators, time expended in parsing, and/or the computational cost of exploring certain branches of the hypothesis tree, for example. Multiple tokenization techniques may produce unfavorable output when paired with a specific typing technique, for example. In such a case, the evaluator manager 116 may choose to discontinue the evaluation of further tokenization techniques and instead evaluate other typing and/or framing technique (e.g., may backtrack), and may return to the evaluation of tokenization techniques at a later time during exploration of the hypothesis tree 200.

Figure 6:
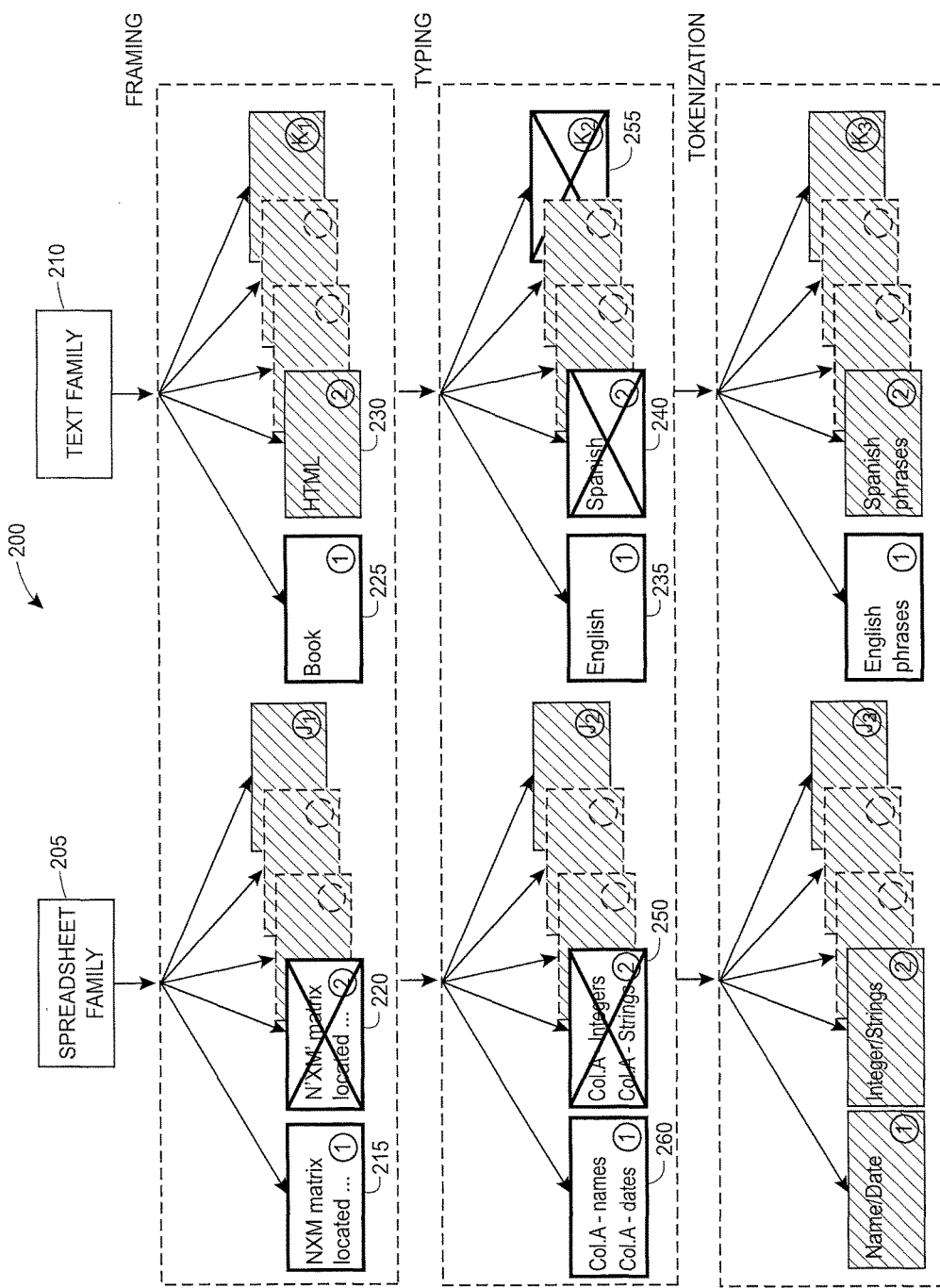

FIG. 6 illustrates an example scenario in which an ADP system 102 even further explores the hypothesis tree 200. In this example scenario, the system 102 abandons members 240 and 255, and evaluates hypothesis class member 260. Meanwhile, the system transitions from evaluating member 235 to the evaluation of higher level member 265.

The evaluation of hypothesis class members prescribing candidate tokenization techniques, for framed and typed data set, are evaluated by tokenizing part of or all of the input data set with the candidate tokenizing techniques, in an embodiment. The evaluation of candidate tokenization techniques serves as a final evaluation for a specific combination of parsing possibilities, for example. In the example scenario of FIG. 6, tokenizing according to hypothesis class member 265 may produce expected, rich, meaningful, or otherwise useful output. In such a case, the ADP system 102 may choose member 265 as a hypothesis class member with a particularly high confidence indicator. In some embodiments, the ADP system 102 may explore "branches" of the hypothesis class tree and refine prior/conditional probabilities until one class member (i.e. one combination of parsing techniques) distinguishes itself from the other members currently being explored, where one member may distinguish itself by having an associated confidence indicator above a threshold, for example. In other embodiments, the ADP system 102 may explore "branches" of the hypothesis class tree and refine prior/conditional probabilities until a certain number of confidence indicators are stable with respect to further explored branches of the hypothesis class tree.

Therefore, the techniques of the current disclosure may be utilized to automatically parse a target data set, without the need to explore all the available options of parsing techniques, at least in some embodiments and/or scenarios. An automated data parsing (ADP) system establishes initial values of confidence indicators associated with certain hypothesis class members prescribing candidate framing, typing, and tokenization techniques, and subsequently refines or updates the confidence indicators, in some embodiments. The ADP system determines an appropriate parsing technique for the target data set based on the increasingly refined confidence indicators, and applies the appropriate parsing technique to parse the target data set, in some embodiments.

Figure 7:
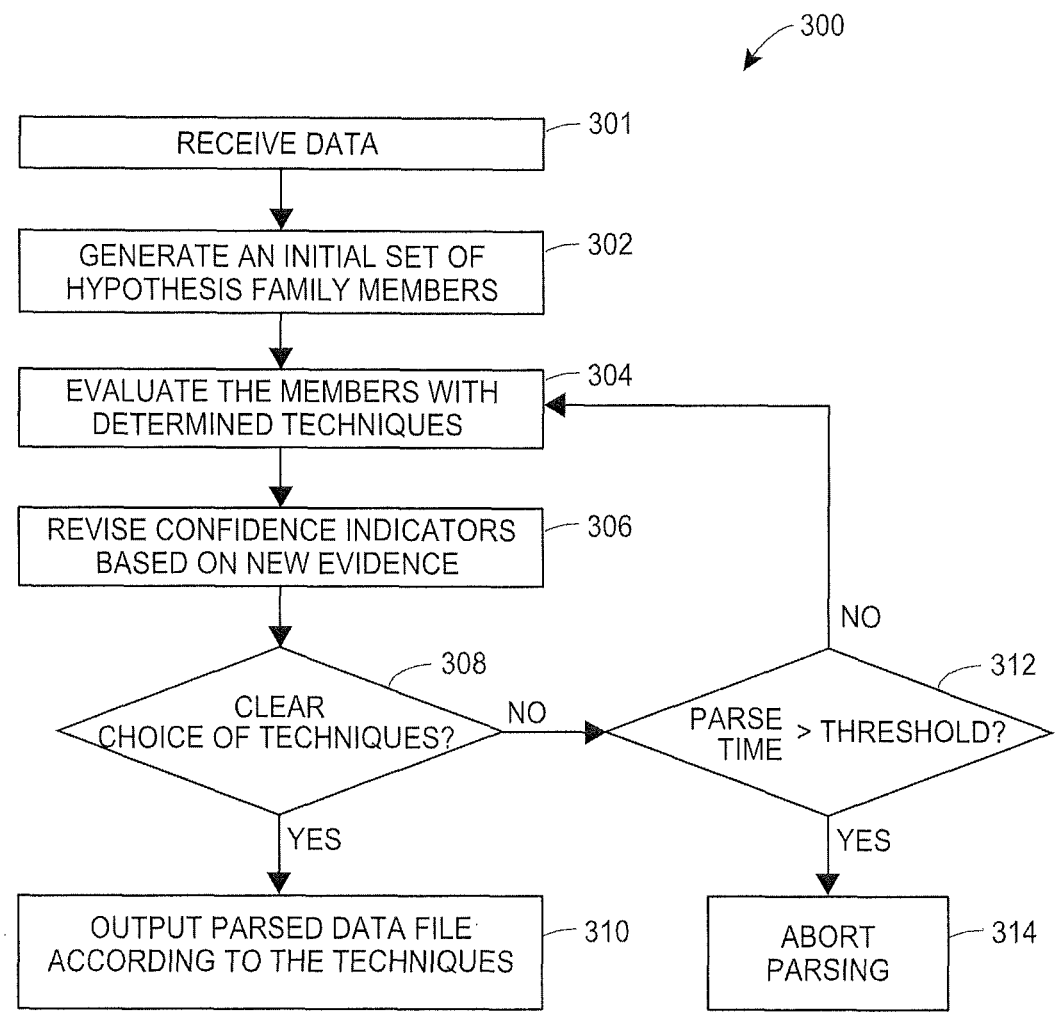
FIG. 7 is a flow diagram of an example method for automatically parsing a data set.

FIG. 7 is a flow diagram of an example method 300 for determining and applying an appropriate parsing technique. The method 300 may be implemented in the automated data parsing system 102, for example. In other embodiments, the method 300 is implemented by another suitable system.

At block 301, an input data file or set is received. In some embodiments, a data file is uploaded from a user computer, via a network, to an ADP system. For example, the ADP system may cause a data entry screen to be displayed on a display device of a user computer, such as user computer 105. The data entry screen includes multiple user controls for facilitating a user to input data to the ADP system, in an embodiment. For example, the data entry screen may include a text box into which natural language input may be entered, or a user may indicate an input data set by entering its file name in the text box or browsing the user's file system to select a particular data set.

At block 302, an initial set of hypothesis class members with corresponding confidence indicators are generated. The members and confidence indicators may be based on accumulated reference data, subjective models, may be arbitrary, etc. In an embodiment, the initial set of members and confidence indicators may be generated based on information regarding prior activity of the user or of a plurality of users. For example, a user may statistically upload a higher number of spreadsheet data sets than image data sets, and, therefore, values of the confidence indicators associated with candidate parsing techniques for spreadsheet data sets are greater than the values of confidence indicators associated with candidate parsing techniques for image data sets, according to an embodiment. For instance, a user may upload more CSV spreadsheet data sets than Microsoft Excel® data sets, and, therefore, the values of the confidence indicators associated with candidate parsing techniques for CSV spreadsheet data sets may be greater than the values of confidence indicators associated with candidate parsing techniques for Microsoft Excel® data sets, as an illustrative example.

Each of the set of hypothesis class members may be associated with one or more combinations of one or more candidate framing techniques, one or more candidate typing techniques, and/or one or more candidate tokenization techniques (e.g., one or more parsing branches of a hypothesis class tree). As an illustrative example, a plurality of parsing branches containing candidate framing, typing and tokenization techniques may be developed assuming the data file is a text file, where one branch may assume a text file containing English language statements and a separate branch may assume a text file containing Spanish language statements. Next (block 304), the hypothesis class members may be evaluated by framing, typing, and tokenizing a subset of the data file according to the candidate framing, typing, and tokenizing techniques prescribed by the members. As a result of evaluating the members, new evidence is available that may be used to refine or update the values of confidence indicators. This new evidence may include an indication of the failure of certain candidate framing techniques, for example, or a rough initial assumption based on file extension may be confirmed after typing the data file, for example.

At block 306 the refined confidence indicators are used to develop a new set of hypothesis class members to be evaluated. The new set of members may include members prescribing candidate framing techniques, members prescribing candidate framing and typing techniques, and/or members prescribing candidate framing, typing, and tokenization techniques. The new set of members may include members from previously unexplored branches of the hypothesis class tree, in an embodiment. At block 308, it is determined if there is one preferable choice of candidate parsing technique made up of preferable members prescribing framing, typing, and tokenization techniques. For example, a preferable choice of member may be defined as a member that has the richest (i.e. the most understandable or diverse) parsing output. Alternatively, a preferable choice of member may be defined as a member with a stable confidence indicator, with respect to further exploration of the hypothesis class tree. If there is a preferable, or clear, choice of parsing technique, the flow continues to block 310 where the remaining portion of the data file is parsed according to the preferable parsing technique.

If there is no preferable or clear choice of hypothesis class member, the flow continues to block 312. At block 312, the time expended in parsing (the parsing time) is compared with a threshold value, in some embodiments. For example, the threshold value may be pre-defined. If the parsing time is greater than the threshold value, the flow may continue to block 314 and may abort parsing. However, if the parsing time is less than the threshold value, the flow may revert to block 304 where the newly determined hypothesis class members, from block 306, are evaluated.

Blocks 304, 306, and 308 may be repeated until a preferred, or clear combination of hypothesis class members is identified, confidence indicators associated with hypothesis class members are stable with respect to further exploration of the hypothesis class tree (self-consistent), or the parse time exceeds the threshold.

While many methods and systems have been described herein as being implemented using one or more processors executing machine readable instructions, they may be implemented at least partially in hardware, and may be implemented by a variety of computing systems and devices. Thus, the method blocks and system blocks described herein may be implemented in one or more standard multi-purpose central processing units (CPUs), one or more special purpose processing units, or on specifically designed hardware such as an application-specific integrated circuit (ASIC) or other hard-wired device as desired. When implemented using a processor executing machine readable instructions, the machine readable instructions may be stored in any non-transitory, tangible computer readable storage medium such as on a magnetic disk, an optical disk (such as a compact disk (CD), a digital versatile disk (DVD)), a flash memory, a memory card, a memory stick, a random-access memory (RAM), a read-only memory (ROM), a database, DNA (Deoxyribonucleic Acid) or other biological or chemical media, etc.

In one embodiment, a method for determining a parsing technique for a target data set includes: receiving, via a communication link at one or more computing devices, a target data set; applying a framing technique included in the set of framing techniques to at least a portion of the target data set; when a result of the application of the framing technique meets a first condition across the at least the portion of the target data set, applying a typing technique included in a set of typing techniques to the at least the portion of the target data set, the typing technique corresponding to the framing technique; when a result of the application of the typing technique meets a second condition across the at least the portion of the target data set, applying a tokenization technique included in a set of tokenization techniques to the at least the portion of the target data set, the tokenization technique corresponding to the typing technique; and when a result of the application of the tokenization technique meets a third condition across the at least the portion of the target data set, determining the parsing technique for the target data set to include the framing technique, the typing technique and the tokenization technique; and causing an indication of the parsing technique to be generated by the one or more computing devices, wherein the set of framing techniques, the set of typing techniques and the set of tokenization techniques are included in a set of defined parsing techniques.

In other embodiments, the method includes any suitable combination of one or more of the following features.

The method further includes at least one of: selecting the framing technique based on a value of a confidence indicator corresponding to the framing technique, the value of the confidence indicator corresponding to the framing technique being indicative of a measure of confidence that the framing technique is applicable to the target data set; selecting the typing technique based on a value of a confidence indicator corresponding to the typing technique, the value of the confidence indicator corresponding to the typing technique being indicative of a measure of confidence that the typing technique is applicable to the target data set; or selecting the tokenization technique based on a value of a confidence indicator corresponding to the tokenization technique, the value of the confidence indicator corresponding to the tokenization technique being indicative of a measure of confidence that the tokenization technique is applicable to the target data set.

The method further includes updating a value of at least one confidence indicator corresponding to the set of defined parsing techniques based on at least one of: (i) the result of the application of the framing technique, (ii) the result of the application of the typing technique, or (iii) the result of the application of the tokenization technique, wherein the value of the confidence indicator is indicative of a measure of confidence that a particular parsing technique corresponding to the confidence indicator is applicable to the target data set.

The method further includes determining, based on the updated value, that one or more parsing techniques of the set of defined parsing techniques is inapplicable to the target data set.

The framing technique is a first framing technique, the typing technique is a first typing technique, and the tokenization technique is a first tokenization technique; and the method further includes: selecting, based on the updated value of the at least one confidence indicator, at least one of: a second framing technique, a second typing technique, or a second tokenization technique; applying the selection to the target data set; and evaluating a result of the application of the selection to the target data set against a respective condition.

The method further includes at least one of: when the result of the application of the framing technique fails to meet the first condition, generating a first determination that the framing technique and defined parsing techniques that are dependent on the framing technique is inapplicable to the target data set; when the result of the application of the typing technique fails to meet the second condition, generating a second determination that the typing technique and defined parsing techniques that are dependent on the typing technique are inapplicable to the target data set; or when the result of the application of the tokenization technique fails to meet the third condition, generating a third determination that the tokenization technique is inapplicable to the target data set.

The framing technique is a first framing technique, the typing technique is a first typing technique, and the tokenization technique is a first tokenization technique; and the method further includes: selecting, based on at least one of the first determination, the second determination, or the third determination, at least one of: a second framing technique, a second typing technique, or a second tokenization technique; applying the selection to the target data set; and evaluating a result of the application of the selection to the target data set against a respective condition.

The method further includes parsing the target data set using the determined parsing technique to generate a parsed data set, and wherein causing the indication of the parsing technique to be generated comprises causing the parsed data set to be provided to an application.

Each of the first condition, the second condition and the third condition respectively corresponds to at least one of: a threshold of consistency or inconsistency, a threshold of compatibility or incompatibility, or a threshold of coherence or incoherence.

The method further includes determining a candidate class of parsing techniques from the set of parsing techniques, the candidate class of parsing techniques being a subset of the set of parsing techniques and including the framing technique, the typing technique, and the tokenization technique.

Determining the candidate class of parsing techniques comprises determining the candidate class of parsing techniques to include all defined parsing techniques included in the set of defined parsing techniques.

Determining the candidate class of parsing techniques comprises selecting the candidate class from the set of defined parsing techniques based on a value of a confidence indicator corresponding to the candidate class, and the value of the confidence indicator is indicative of a measure of confidence that the target data set is included in the candidate class.

The method further includes determining an initial value of the confidence indicator corresponding to the candidate class based on historical data.

The candidate class of parsing techniques is a first candidate class; and updating the value of at least one confidence indicator corresponding to the set of parsing techniques comprises at least one of: updating a value of at least one confidence indicator corresponding to the first candidate class, or updating a value of at least one confidence indicator corresponding to a second candidate class.

In another embodiment, an automated data parsing system for automatically parsing a target data set comprises: an interface to a communication link, the interface configured to receive the target data set; an evaluator engine configured to determine a parsing technique for the target data set, the determination based on an evaluation of at least one candidate parsing technique against the target data set, the at least one candidate parsing technique included in a set of candidate parsing techniques; a register configured to store a set of confidence indicators corresponding to the set of candidate parsing techniques, wherein a set of values of the set of confidence indicators are updated based on a result of an application of the at least one candidate parsing technique to the target data set; and an output engine configured to provide an output corresponding to the parsing technique.

In other embodiments, the system includes any suitable combination of one or more of the following features.

The system further comprises a parsing execution engine configured to parse the target data set using the parsing technique to generate a parsed data set, and wherein the output provided by the output engine includes the parsed data set.

The output engine is configured to provide the output corresponding to the parsing technique when the set of values of the set of confidence indicators meet a condition, the condition including at least one of: at least a subset of the set of values of the set of confidence indicators corresponds to at least one of an absolute threshold or a relative threshold; each member of the set of candidate parsing techniques has been evaluated against the target data set; or a time limit has been reached.

The parsing technique for the target data set comprises: a framing technique to determine a structure of at least a portion of the target data set, a typing technique to determine a format of one or more entries included in the target data set, and a tokenization technique to determine and interpret segments of information included in the one or more entries of the target data set.

The at least one candidate parsing technique comprises at least one of: one or more candidate framing techniques operable on data sets to determine respective structures of one or more portions of the data sets, one or more candidate typing techniques operable on the data sets to determine formats of entries included in the data sets, or one or more candidate tokenization techniques operable on the data sets to determine and interpret segments of information included in the entries of the data sets.

The application of the at least one candidate parsing technique comprises an application of the at least one candidate parsing technique to at least a portion of the target data set.

The evaluator engine is further configured to: initiate an evaluation of the at least one candidate parsing technique against the target data set, including generating the application of the at least one candidate parsing technique to at least a portion of the target data set; update a value of at least one confidence indicator based on a result of the initiated evaluation of the at least one candidate parsing technique.

The at least one confidence indicator having the updated value corresponds to another candidate parsing technique that is excluded from the at least one candidate parsing technique.

The at least a portion of the target data set is a first portion of the target data set, and the at least one candidate parsing technique is a first at least one candidate parsing technique; and the evaluator engine is further configured to, based on the updated value of the at least one confidence indicator, at least one of: initiate an evaluation of a second at least one candidate parsing technique against the target data set; apply the first at least one candidate parsing technique to a second portion of the target data set; or cause an evaluation of candidate parsing technique that is excluded from the at least one candidate parsing technique to be terminated.

A value of a particular confidence indicator corresponding to a particular candidate parsing technique is indicative of a measure of confidence that the particular parsing technique is applicable to the target data set.

At least a subset of the set of confidence indicators corresponds to the at least one candidate parsing technique, and wherein the at least the subset includes at least one of: a first confidence indicator corresponding to a candidate framing technique, a second confidence indicator corresponding to a candidate typing technique, or a third confidence indicator corresponding to a candidate tokenization technique.

The evaluator engine is further configured to determine the set of candidate parsing techniques.

The evaluator engine is further configured to determine a set of initial values of the set of confidence indicators.

The evaluator engine is further configured to determine the set of initial values of the set of confidence indicators based on at least one of: historical data or a characteristic of the target data set.

The evaluator engine is further configured to generate a new candidate parsing technique applicable to other target data sets, the generation of the new candidate parsing technique based on the evaluation of the at least one candidate parsing technique against the target data set.

The parsing technique for the target data set determined by the evaluator engine is applicable to the target data set.

The set of candidate parsing techniques is included in a set of defined parsing techniques; the set of defined parsing techniques includes one or more classes of parsing techniques, and each of the one or more classes includes a respective set of framing techniques, a respective set of typing techniques, and a respective set of tokenization techniques; and the evaluator engine is further configured to select the set of candidate parsing techniques based a value of a confidence indicator corresponding to a particular class of parsing techniques, the particular class including at least a subset of the set of candidate parsing techniques.

In another embodiment, a method of determining a parsing technique for a target data set includes: receiving, via a communication link at one or more computing devices, the target data set; applying at least one candidate parsing technique to the target data set, the at least one candidate parsing technique included in a set of candidate parsing techniques included in a set of defined parsing techniques; updating, based on a result of the application of the at least one candidate parsing technique to the target data set, one or more values of a set of confidence indicators corresponding to the set of defined parsing techniques; determining a parsing technique for the target data set based on the updated values of the set of confidence indicators; and causing an indication of the parsing technique to be generated by the one or more computing devices.

In other embodiments, the method includes any suitable combination of one or more of the following features.

Determining the parsing technique for the target data set based on the updated values of the set of confidence indicators comprises determining the parsing technique for the target data set when at least one of: at least a subset of the values of the set of confidence indicators corresponds to at least one of an absolute threshold or a relative threshold; each member of the set of candidate parsing techniques has been evaluated against the target data set; or a time limit has been reached.

At least one of: (i) determining the parsing technique for the target data set comprises: determining a framing technique configured to determine a structure of at least a portion of the target data set, determining a typing technique configured to determine a format of one or more entries included in the target data set, and determining a tokenization technique configured to determine and interpret segments of information included in the one or more entries of the target data set; or (ii) applying the at least one candidate parsing technique comprises at least one of: applying one or more candidate framing techniques operable on data sets to determine respective structures of one or more portions of the data sets; applying one or more candidate typing techniques operable on the data sets to determine formats of entries included in the data sets; or applying one or more candidate tokenization techniques operable on the data sets to determine and interpret segments of information included in the entries of the data sets.

At least one of: applying the one of the one or more candidate typing techniques comprises applying the one of the one or more candidate typing techniques after applying at least one candidate framing technique; or applying the one of the one or more candidate tokenization techniques comprises applying the one of the one or more candidate tokenization techniques after applying at least one candidate typing technique.

Applying the at least one candidate parsing technique to the target data set comprises applying a first at least one candidate parsing technique to a first portion of the target data set; and the method further includes performing, based on the updated one or more values of the set of confidence indicators, at least one of: applying a second at least one candidate parsing technique to the target data set; applying the first at least one candidate parsing technique to a second portion of the target data set; or updating a value of a confidence indicator corresponding to a parsing technique excluded from the set of candidate parsing techniques.

The method further includes at least one of: selecting the set of candidate parsing techniques, or determining a set of initial values of the set of confidence indicators corresponding to the set of candidate parsing techniques.

Selecting the set of candidate parsing techniques is based on a value of a confidence indicator corresponding to the set of candidate parsing techniques, and determining the set of initial values of the set of confidence indicators comprises determining the set of initial values of the set of confidence indicators based on historical data.

Applying the at least one candidate parsing technique to the target data set comprises applying the at least one candidate parsing technique to the target data set based on one or more attributes of the at least one candidate parsing technique.

Applying the at least one candidate parsing technique to the target data set based on one or more attributes of the at least one candidate parsing technique comprises at least one of: determining a value of a parameter corresponding to the at least one candidate parsing technique based on the target data set; or executing a function corresponding to the at least one candidate parsing technique on at least a portion of the target data set.

Causing the indication of the parsing technique to be generated comprises parsing the target data set using the determined parsing technique to generate a parsed data set, and wherein the indication of the parsing technique includes the parsed data set.

In yet another embodiment, a method of determining a parsing technique for a target data set includes: (i) accessing an set of indications of a plurality of parsing techniques, wherein: the plurality of parsing techniques includes a set of framing techniques, a set of typing techniques, and a set of tokenization techniques, each parsing technique corresponds to a respective indication of the set, the set defines relationships between one or more members of the set of framing techniques, one or more members of the set of typing techniques, and one or more members of the set of tokenization techniques, each typing technique is dependent on one or more framing techniques, and each tokenization technique is dependent on one or more typing techniques; (ii) for each indication of the set, determining a value of a respective confidence indicator, the value of the confidence indicator being indicative of a measure of confidence that the respective parsing technique corresponding to the each indication is applicable to the target data set; (iii) determining one or more candidate parsing techniques; (iv) applying the determined one or more candidate parsing techniques from the plurality of parsing techniques to the target data set; (v) updating one or more values of the set of respective confidence indicators based on the result of the application of the determined one or more candidate parsing techniques; (vi) determining one or more additional candidate parsing techniques to apply to the target data set based on the updated values; (vii) repeating (iv) through (vi) until: a value of a confidence indicator of a particular framing technique meets a framing condition, a value of a confidence indicator corresponding to a particular typing technique meets a typing condition, the particular typing technique dependent on the particular framing technique, and a value of a confidence indicator corresponding to a particular tokenization technique meets a tokenization condition, the particular tokenization technique dependent on the particular framing technique; and (viii) after executing (vii), determining the parsing technique for the target data set to include the particular framing technique, the particular typing technique and the particular tokenization technique.

In other embodiments, the method includes any suitable combination of one or more of the following features.

Determining the one or more candidate parsing techniques comprises determining a framing technique included in the set of framing techniques, and wherein determining the one or more additional candidate parsing techniques comprises determining a typing technique dependent on the framing technique.

Determining the one or more candidate parsing techniques comprises selecting the one or more candidate parsing techniques based on values of a set of confidence indicators corresponding to the one or more candidate parsing techniques.

In still another embodiment, a method of determining a parsing technique for a target data set includes: accessing an set of indications of a plurality of parsing techniques, wherein: the plurality of parsing techniques includes a set of framing techniques, a set of typing techniques, and a set of tokenization techniques, each parsing technique corresponds to a respective indication of the set, the set defines relationships between one or more members of the set of framing techniques, one or more members of the set of typing techniques, and one or more members of the set of tokenization techniques, each typing technique is dependent on one or more framing techniques, and each tokenization technique is dependent on one or more typing techniques; for each indication of the set, determining a value of a respective confidence indicator, the value of the confidence indicator being indicative of a measure of confidence that the respective parsing technique corresponding to the each indication is applicable to the target data set; determining a candidate framing technique included in the plurality of parsing techniques; applying the candidate framing technique to the target data set; updating one or more values of the set of respective confidence indicators based on a result of the application of the candidate framing technique; based on the updated one or more values, at least one of: determining a first set of other parsing techniques of the plurality of parsing techniques and applying members of the first set individually to the target data set, or determining a second set of other parsing techniques of the plurality of parsing techniques to omit from application to the target data set.

In other embodiments, the method includes any suitable combination of one or more of the following features.

The result is a framing result that meets a framing condition, the first set of other parsing techniques includes a typing technique dependent on the framing technique, and the method further comprises: generating a typing result based on the application of the typing technique to the target data set; updating the one or more values of the set of respective confidence indicators based on the typing result; and based on the updated values, at least one of: determining a third set of other parsing techniques of the plurality of parsing techniques and applying members of the third set individually to the target data set, or determining a fourth set of other parsing techniques of the plurality of parsing techniques to omit from application to the target data set.

The typing result meets a typing condition, the third set of other parsing techniques includes a tokenization technique dependent on the typing technique, and the method further comprises: generating a tokenization result based on the application of the tokenization technique; when the tokenization result meets a tokenization condition, determining the parsing technique for the target data set to include the framing technique, the typing technique and the tokenization technique; when the tokenization result fails to meet the tokenization condition: updating the one or more values of the set of respective confidence indicators based on the tokenization result; and at least one of: determining a fifth set of other parsing techniques of the plurality of parsing techniques to apply to the target data set, or determining a sixth set of other parsing techniques of the plurality of parsing techniques to omit from application to the target data set.

In another embodiment, a method for parsing a target data set includes: receiving the target data set; accessing a set of candidate parsing techniques; accessing a set of confidence indicators corresponding to the set of candidate parsing techniques, wherein a value of each confidence indicator is indicative of a measure of confidence that a respective candidate parsing technique is appropriate for parsing the target data set; based on the values of the set of confidence indicators, determining at least one of: (i) a group of candidate parsing techniques to evaluate against the target data set, the group of candidate parsing techniques being from the set of candidate parsing techniques, or (ii) an order of evaluation, against the target data set, of at least some candidate parsing techniques; evaluating, against the target data set, (i) the group of candidate parsing techniques and/or (ii) candidate parsing techniques according to the order to determine a set of one or more parsing techniques, from the set of candidate parsing techniques, to use in parsing the target data set; and parsing the target data set using the determined set of one or more parsing techniques.

In other embodiments, the method includes any suitable combination of one or more of the following features.

The method further includes updating confidence indicators based on evaluation of candidate parsing techniques, wherein determining at least one of (i) the group of candidate parsing techniques or (ii) the order of evaluation is based on updated confidence indicators.

Determining at least one of (i) the group of candidate parsing techniques or (ii) the order of evaluation is based on updated confidence indicators comprises at least one of (i)

revising the determined group of candidate parsing techniques or (ii) revising the order of evaluation based on updated confidence indicators.

The method further includes, based on evaluation of a first candidate parsing technique, excluding at least one of (i) the first candidate parsing technique, or (ii) a second candidate parsing technique from the set of one or more parsing techniques to use in parsing the target data set.

The method further includes, based on evaluation of a first candidate parsing technique, determining a second group of candidate parsing techniques to evaluate against the target data set.

Accessing the set of candidate parsing techniques comprises accessing a set of candidate parsing techniques comprising a set of one or more candidate framing techniques, a set of one or more candidate typing techniques, and a set of one or more candidate tokenization techniques.

Evaluating (i) the group of candidate parsing techniques and/or (ii) candidate parsing techniques according to the order comprises: evaluating one or more candidate typing techniques in conjunction with one of the candidate framing techniques only when evaluation of the one candidate framing technique indicates the one candidate framing technique is, at least preliminarily, acceptable, evaluating one or more candidate tokenization techniques in conjunction with one of the one or more candidate typing techniques only when evaluation of the one candidate typing technique indicates the one candidate typing technique is, at least preliminarily, acceptable.

The method further includes determining a set of initial values of the set of confidence indicators:

Determining the set of initial values of the set of confidence indicators comprises at least one of: determining the set of initial values based on historical data, randomly determining the set of initial values, or determining the set of initial values using a formula.

The group of candidate parsing techniques corresponds to a type of data set.

The group of candidate parsing techniques is one of a plurality of groups of candidate parsing techniques, each group corresponding to a different type of data set.

A particular candidate parsing technique is included in more than one group.

Evaluating the group of candidate parsing techniques against the target data set comprises applying at least one candidate parsing technique included in the group to at least a portion of the target data set.

The present disclosure has been described with reference to specific examples, which are intended to be illustrative only and not to be limiting. It will be apparent to those of ordinary skill in the art that changes, additions or deletions may be made to the disclosed examples without departing from the spirit and scope of the disclosure. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of this application.

Thus, many modifications and variations may be made in the techniques and systems described and illustrated herein without departing from the spirit and scope of the present invention. Accordingly, it should be understood that the methods and systems described herein are illustrative only and are not limiting upon the scope of the invention.

What is claimed:

1. A method for determining a parsing technique for a target data set, the method comprising:

receiving, at one or more computing devices, a target data set via a communication link;

applying a framing technique selected from a set of framing techniques to at least a portion of the target data set;

determining that a result of the application of the framing technique meets a first condition across the at least the portion of the target data set;

applying a typing technique selected from a set of typing techniques to the at least the portion of the target data set, the typing technique corresponding to the framing technique;

determining that a result of the application of the typing technique meets a second condition across the at least the portion of the target data set;

applying a tokenization technique selected from a set of tokenization techniques to the at least the portion of the target data set, the tokenization technique corresponding to the typing technique, wherein each tokenization technique in the set of tokenization techniques is a respective technique for generating tokens, and wherein the set of tokenization techniques includes at least i) a first tokenization technique corresponding to segmenting input data that includes dates, and ii) a second tokenization technique, different than the first tokenization technique, corresponding to segmenting input data that includes numbers that are not date information; and determining that a result of the application of the tokenization technique meets a third condition across the at least the portion of the target data set;

determining the parsing technique for the target data set to include the framing technique, the typing technique and the tokenization technique; and causing an indication of the parsing technique to be generated by the one or more computing devices;

wherein the set of framing techniques, the set of typing techniques and the set of tokenization techniques are included in a set of defined parsing techniques.

2. The method of claim 1, further comprising at least one of:

selecting the framing technique based on a value of a confidence indicator corresponding to the framing technique, the value of the confidence indicator corresponding to the framing technique being indicative of a measure of confidence that the framing technique is applicable to the target data set;

selecting the typing technique based on a value of a confidence indicator corresponding to the typing technique, the value of the confidence indicator corresponding to the typing technique being indicative of a measure of confidence that the typing technique is applicable to the target data set; or selecting the tokenization technique based on a value of a confidence indicator corresponding to the tokenization technique, the value of the confidence indicator corresponding to the tokenization technique being indicative of a measure of confidence that the tokenization technique is applicable to the target data set.

3. The method of claim 1, further comprising updating a value of at least one confidence indicator corresponding to the set of defined parsing techniques based on at least one of: (i) the result of the application of the framing technique, (ii) the result of the application of the typing technique, or (iii) the result of the application of the tokenization technique,
wherein the value of the confidence indicator is indicative of a measure of confidence that a particular parsing technique corresponding to the confidence indicator is applicable to the target data set.

4. The method of claim 3, further comprising determining, based on the updated value, that one or more parsing techniques of the set of defined parsing techniques is inapplicable to the target data set.

5. The method of claim 3, wherein:
the framing technique is a first framing technique, the typing technique is a first typing technique, and the tokenization technique is a first tokenization technique; and
the method further comprises:
selecting, based on the updated value of the at least one confidence indicator, at least one of: a second framing technique, a second typing technique, or a second tokenization technique;
applying the selection to the target data set; and
evaluating a result of the application of the selection to the target data set against a respective condition.

6. The method of claim 1, further comprising at least one of:
when the result of the application of the framing technique fails to meet the first condition, generating a first determination that the framing technique and defined parsing techniques that are dependent on the framing technique is inapplicable to the target data set;
when the result of the application of the typing technique fails to meet the second condition, generating a second determination that the typing technique and defined parsing techniques that are dependent on the typing technique are inapplicable to the target data set; or
when the result of the application of the tokenization technique fails to meet the third condition, generating a third determination that the tokenization technique is inapplicable to the target data set.

7. The method of claim 6,
the framing technique is a first framing technique, the typing technique is a first typing technique, and the tokenization technique is a first tokenization technique; and
wherein the method further comprises:
selecting, based on at least one of the first determination, the second determination, or the third determination, at least one of: a second framing technique, a second typing technique, or a second tokenization technique;
applying the selection to the target data set; and
evaluating a result of the application of the selection to the target data set against a respective condition.

8. The method of claim 1, further comprising parsing the target data set using the determined parsing technique to generate a parsed data set, and wherein causing the indication of the parsing technique to be generated comprises causing the parsed data set to be provided to an application.

9. The method of claim 1, wherein each of the first condition, the second condition and the third condition respectively corresponds to at least one of:
a threshold of consistency or inconsistency,
a threshold of compatibility or incompatibility, or
a threshold of coherence or incoherence.

10. The method of claim 1, further comprising determining a candidate class of parsing techniques from the set of parsing techniques, the candidate class of parsing techniques being a subset of the set of parsing techniques and including the framing technique, the typing technique, and the tokenization technique.

11. The method of claim 10, wherein determining the candidate class of parsing techniques comprises determining the candidate class of parsing techniques to include all defined parsing techniques included in the set of defined parsing techniques.

12. The method of claim 10, wherein:
determining the candidate class of parsing techniques comprises selecting the candidate class from the set of defined parsing techniques based on a value of a confidence indicator corresponding to the candidate class, and
the value of the confidence indicator is indicative of a measure of confidence that the target data set is included in the candidate class.

13. The method of claim 12, further comprising determining an initial value of the confidence indicator corresponding to the candidate class based on historical data.

14. The method of claim 10, wherein:
the candidate class of parsing techniques is a first candidate class; and
updating the value of at least one confidence indicator corresponding to the set of parsing techniques comprises at least one of:
updating a value of at least one confidence indicator corresponding to the first candidate class, or
updating a value of at least one confidence indicator corresponding to a second candidate class.

15. An automated data parsing system for automatically parsing a target data set, the system comprising:
an interface to a communication link, the interface configured to receive the target data set;
one or more processors; and
one or more memory devices storing machine readable instructions that, when executed by the one or more processors, cause the one or more processors to:
determine a parsing technique for the target data set, the determination based on an evaluation of at least one candidate parsing technique against the target data set, the at least one candidate parsing technique included in a set of candidate parsing techniques, wherein the parsing technique includes a framing technique to determine respective structures of one or more portions of the target data set, the framing technique selected from a set of different framing techniques, wherein the parsing technique also includes a typing technique to determine formats of entries included in the target data set, the typing technique selected from a set of different typing techniques, the typing technique corresponding to the framing technique, wherein the parsing technique further includes a tokenization technique to determine and interpret segments of information included in the one or more entries of the target data set, the tokenization technique selected from a set of different tokenization techniques, wherein the set of tokenization techniques includes at least i) a first tokenization technique corresponding to segmenting input data that includes dates, and ii) a second tokenization technique, different than the first tokenization technique, corresponding to segmenting input data that includes numbers that are not date information;
wherein determining the parsing technique includes:

applying the framing technique selected to at least a portion of the target data set, determining that a result of the application of the framing technique meets a first condition across the at least the portion of the target data set, applying the typing technique to the at least the portion of the target data set, determining that a result of the application of the typing technique meets a second condition across the at least the portion of the target data set, applying the tokenization technique to the at least the portion of the target data set, and determining that a result of the application of the tokenization technique meets a third condition across the at least the portion of the target data set;

wherein the one or more memory devices further machine readable instructions that, when executed by the one or more processors, cause the one or more processors:

provide an output corresponding to the parsing technique.

16. The system of claim 15, wherein the one or more memory devices store machine readable instructions that, when executed by the one or more processors, cause the one or more processors to parse the target data set using the parsing technique to generate a parsed data set, and wherein the output includes the parsed data set.

17. The system of claim 15, wherein:

one or more memory devices store machine readable instructions that, when executed by the one or more processors, cause the one or more processors to store, in a memory device included in or separate from the one or more memory devices, a set of confidence indicators corresponding to the set of candidate parsing techniques, wherein a set of values of the set of confidence indicators are updated based on a result of an application of the at least one candidate parsing technique to the target data set;

the set of conditions corresponding to application of the candidate parsing technique to the target data set producing a favorable result includes at least one of:

at least a subset of the set of values of the set of confidence indicators meeting at least one of an absolute threshold or a relative threshold;

whether each member of the set of candidate parsing techniques has been evaluated against the target data set; or whether a time limit has been reached.

18. The system of claim 15, wherein the parsing technique for the target data set comprises:

a framing technique to determine a structure of at least a portion of the target data set, and a typing technique to determine a format of one or more entries included in the target data set a tokenization technique to determine and interpret segments of information included in the one or more entries of the target data set.

19. The system of claim 15, wherein the at least one candidate parsing technique comprises at least one of:

one or more candidate framing techniques operable on data sets to determine respective structures of one or more portions of the data sets, or one or more candidate typing techniques operable on the data sets to determine formats of entries included in the data sets.

20. The system of claim 15, wherein the application of the at least one candidate parsing technique comprises an application of the at least one candidate parsing technique to at least a portion of the target data set.

21. The system of claim 15, wherein the one or more memory devices further store machine readable instructions that, when executed by the one or more processors, cause the one or more processors to:

store, in a memory device included in or separate from the one or more memory devices, a set of confidence indicators corresponding to the set of candidate parsing techniques;

initiate an evaluation of the at least one candidate parsing technique against the target data set, including generating the application of the at least one candidate parsing technique to at least a portion of the target data set; and update a value of at least one confidence indicator based on a result of the initiated evaluation of the at least one candidate parsing technique.

22. The system of claim 21, wherein the at least one confidence indicator having the updated value corresponds to another candidate parsing technique that is excluded from the at least one candidate parsing technique.

23. The system of claim 21, wherein:

the at least a portion of the target data set is a first portion of the target data set, and the at least one candidate parsing technique is a first at least one candidate parsing technique; and the one or more memory devices further store machine readable instructions that, when executed by the one or more processors, cause the one or more processors to, based on the updated value of the at least one confidence indicator, at least one of:

initiate an evaluation of a second at least one candidate parsing technique against the target data set;

apply the first at least one candidate parsing technique to a second portion of the target data set; or cause an evaluation of candidate parsing technique that is excluded from the at least one candidate parsing technique to be terminated.

24. The system of claim 15, wherein a value of a particular confidence indicator corresponding to a particular candidate parsing technique is indicative of a measure of confidence that the particular parsing technique is applicable to the target data set.

25. The system of claim 15, wherein the set of conditions corresponding to application of the candidate parsing technique to the target data set producing a favorable result includes at least one of:

a first confidence indicator corresponding to whether application of a candidate framing technique to the target data set produced a favorable result, a second confidence indicator corresponding to whether application of a candidate typing technique to the target data set produced a favorable result, or a third confidence indicator corresponding to whether application of a candidate tokenization technique to the target data set produced a favorable result.

26. The system of claim 15, wherein the one or more memory devices further store machine readable instructions that, when executed by the one or more processors, cause the one or more processors to determine the set of candidate parsing techniques.

27. The system of claim 15, wherein the one or more memory devices further store machine readable instructions that, when executed by the one or more processors, cause the one or more processors to determine a set of initial values of the set of confidence indicators.

28. The system of claim 15, wherein the one or more memory devices further store machine readable instructions that, when executed by the one or more processors, cause the one or more processors to:
- determine a set of initial values of a set of confidence indicators based on at least one of: historical data or a characteristic of the target data set;
- update the set of confidence indicators based on a result of an application of the at least one candidate parsing technique to the target data set.

29. The system of claim 15, wherein the one or more memory devices further store machine readable instructions that, when executed by the one or more processors, cause the one or more processors to generate a new candidate parsing technique applicable to other target data sets, the generation of the new candidate parsing technique based on the evaluation of the at least one candidate parsing technique against the target data set.

30. The system of claim 15, wherein the parsing technique for the determined target data set is applicable to the target data set.

31. The system of claim 15, wherein:
- the set of candidate parsing techniques is included in a set of defined parsing techniques;
- the set of defined parsing techniques includes one or more classes of parsing techniques, and each of the one or more classes includes a respective set of framing techniques, a respective set of typing techniques, and a respective set of tokenization techniques; and
- the one or more memory devices further store machine readable instructions that, when executed by the one or more processors, cause the one or more processors to select the set of candidate parsing techniques based a value of a confidence indicator corresponding to a particular class of parsing techniques, the particular class including at least a subset of the set of candidate parsing techniques.

* * * * *